United States Patent
Johnson et al.

(10) Patent No.: US 12,295,389 B2
(45) Date of Patent: May 13, 2025

(54) TREATMENT OF FOOD PRODUCTS

(71) Applicant: Evonik Operations GmbH, Essen (DE)

(72) Inventors: Andrea Johnson, Germantown, TN (US); Brandon Cryar, Fortson, GA (US); John R. Dankert, Lafayette, LA (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/650,170

(22) Filed: Apr. 30, 2024

(65) Prior Publication Data

US 2024/0373888 A1    Nov. 14, 2024

(30) Foreign Application Priority Data

May 12, 2023  (EP) .................................... 23173129

(51) Int. Cl.
| | |
|---|---|
| *A23L 13/50* | (2016.01) |
| *A22C 17/08* | (2006.01) |
| *A22C 21/00* | (2006.01) |
| *A22C 25/02* | (2006.01) |
| *A23B 4/12* | (2006.01) |
| *A23B 4/24* | (2006.01) |

(52) U.S. Cl.
CPC .............. *A23L 13/55* (2016.08); *A22C 17/08* (2013.01); *A22C 21/0061* (2013.01); *A22C 25/02* (2013.01); *A23B 4/12* (2013.01); *A23B 4/24* (2013.01)

(58) Field of Classification Search
CPC ..... A23L 13/55; A22C 17/08; A22C 21/0061; A22C 25/02; A23B 4/12; A23B 4/24
See application file for complete search history.

(56) References Cited

U.S. PATENT DOCUMENTS

| | | |
|---|---|---|
| 9,220,799 B2 | 12/2015 | Ishii et al. |
| 10,591,231 B2 | 3/2020 | Russell et al. |
| 10,598,447 B2 | 3/2020 | Russell et al. |
| 10,814,290 B2 | 10/2020 | Bauer |
| 11,051,534 B2 | 7/2021 | Garwood |
| 11,096,407 B2 | 8/2021 | Larsen |
| 11,464,236 B2 * | 10/2022 | Garwood ............... A22C 17/08 |

(Continued)

FOREIGN PATENT DOCUMENTS

| | | |
|---|---|---|
| CA | 2 628 554 | 5/2007 |
| CA | 2 864 079 | 9/2013 |

(Continued)

OTHER PUBLICATIONS

Shai Barbut, "The Science of Poultry and Meat Processing", Food Science Department, University of Guelph, Ontario Cananda, Jul. 1, 2015.

(Continued)

*Primary Examiner* — Anthony J Weier
(74) *Attorney, Agent, or Firm* — Grüneberg and Myers PLLC

(57) ABSTRACT

A method treats a food product for increasing the weight of the food product. The food product is an animal carcass, poultry, meat, seafood or parts thereof. The method includes introducing nano-bubbles (NB) into water or an aqueous solution to provide NB-including water and contacting the food product with NB-including water for a time sufficient to increase the weight of the food product.

23 Claims, 13 Drawing Sheets

(56) References Cited

U.S. PATENT DOCUMENTS

| | | | |
|---|---|---|---|
| 11,696,592 B2 | 7/2023 | Garwood | |
| 11,766,056 B2 | 9/2023 | Larsen | |
| 11,856,960 B2* | 1/2024 | Garwood | A22C 17/0026 |
| 2006/0054205 A1 | 3/2006 | Yabe et al. | |
| 2006/0204642 A1 | 9/2006 | Adams et al. | |
| 2007/0020378 A1 | 1/2007 | Shirade | |
| 2009/0053320 A1 | 2/2009 | Cho | |
| 2009/0285957 A1 | 11/2009 | Kishinami | |
| 2010/0086660 A1* | 4/2010 | Takai | A23C 11/103 |
| | | | 426/518 |
| 2010/0203206 A1 | 8/2010 | Hayata et al. | |
| 2012/0183664 A1 | 7/2012 | Ogawa et al. | |
| 2013/0259989 A1 | 10/2013 | Nakamura | |
| 2015/0010604 A1 | 1/2015 | Ishii et al. | |
| 2015/0258232 A1 | 9/2015 | Ishii et al. | |
| 2016/0236158 A1 | 8/2016 | Bauer | |
| 2017/0259219 A1 | 9/2017 | Russell et al. | |
| 2019/0008190 A1 | 1/2019 | Garwood | |
| 2019/0059420 A1 | 2/2019 | Larsen | |
| 2019/0216053 A1 | 7/2019 | Nakao | |
| 2020/0003506 A1 | 1/2020 | Russell et al. | |
| 2020/0029583 A1* | 1/2020 | Garwood | B02C 23/20 |
| 2020/0182566 A1 | 6/2020 | Russell et al. | |
| 2021/0298336 A1 | 9/2021 | Garwood | |
| 2021/0337834 A1 | 11/2021 | Larsen | |
| 2023/0172217 A1* | 6/2023 | Garwood | B03D 1/1412 |
| | | | 241/20 |
| 2023/0276793 A1 | 9/2023 | Ovissipour et al. | |
| 2024/0188592 A1 | 6/2024 | Israni et al. | |
| 2024/0189344 A1 | 6/2024 | Israni et al. | |

FOREIGN PATENT DOCUMENTS

| | | |
|---|---|---|
| CA | 2 888 661 | 4/2015 |
| CA | 3 012 361 | 9/2017 |
| CA | 3 015 072 | 2/2019 |
| CA | 3 222 368 | 2/2019 |
| JP | 2017-38528 | 2/2017 |
| JP | 2018-29508 | 3/2018 |
| JP | 2018-102174 | 7/2018 |
| JP | 2018-153155 | 10/2018 |
| JP | 6431954 | 11/2018 |
| JP | 7144053 | 9/2022 |
| JP | 7324483 | 8/2023 |
| KR | 10-2021-0127039 | 10/2021 |
| WO | 2004/030837 | 4/2004 |
| WO | 2005/036992 | 4/2005 |
| WO | 2007/007969 | 1/2007 |
| WO | 2007/060942 | 5/2007 |
| WO | 2009/016998 | 2/2009 |
| WO | 2013/129245 | 9/2013 |
| WO | 2013/150590 | 10/2013 |
| WO | 2015/048904 | 4/2015 |
| WO | 2015/071995 | 5/2015 |
| WO | 2017/117419 | 7/2017 |
| WO | 2017/156410 | 9/2017 |
| WO | 2018/181635 | 10/2018 |
| WO | 2019/138590 | 7/2019 |
| WO | 2020/138246 | 7/2020 |
| WO | 2020/138247 | 7/2020 |
| WO | 2021/188166 | 9/2021 |
| WO | 2024/129460 | 6/2024 |
| WO | 2024/129474 | 6/2024 |

OTHER PUBLICATIONS

Extended European Search Report dated Oct. 25, 2023, in European Application No. 23173129.0, 7 pages.

* cited by examiner

TREATMENT OF FOOD PRODUCTS

CROSS-REFERENCE TO RELATED APPLICATIONS

This application claims the benefit of priority to European Patent Application No. 23173129.0, filed on May 12, 2023. The content of this application is hereby incorporated by reference in its entirety.

BACKGROUND

Technical Field of the Invention

The invention relates to a method of treating a food product for increasing the weight of the food product according to the description herein.

Description of Related Art

The present invention relates to the field of treatment of food products for increasing the weight of the food product.

Poultry products constitute almost 40% of global protein production in 2020. Poultry processing is a highly automated and machine-driven production industry.

The poultry slaughter process consists of steps to clean and process large numbers of birds. Each plant has different specific applications, but the following procedures are common in commercial poultry processing as revealed in "The science of poultry and meat processing/Shai Barbut, PhD. University of Guelph, page 105-144, 2015, ISBN 978-0-88955-626-3". Live birds are delivered to the receiving area of a processing plant, rendered unconscious and then hung on a mechanical line and slaughtered. After feather removal the birds may go through a water application to wash the birds which may optionally contain an antimicrobial treatment such as chlorine bleach or peracetic acid. During this part of processing the head and feet (paws) are removed. Several plants have opted to use either an antimicrobial containing water spray cabinet or immersion dip tank after this stage to reduce organic material and microbial load. Carcasses are eviscerated and then move through one or more bird washes, which may optionally contain antimicrobials, for further cleaning. Therefore, throughout the line, at various places in evisceration plants may use spray cabinets and/or dip or wash applications.

Afterwards carcasses are cooled. The immersion chilling process may consist of a series of chillers and dips in tanks and reservoirs that vary in size, dwell time, and temperature. Most plants have either a single large chiller or a series of large volume chillers, which can optionally contain compositions for antimicrobial treatment comprising for example peracetic acid. The chilling process itself lowers the temperature of the carcasses, reduces microbial levels on the carcasses and in the body of the water, and increases the moisture content of the carcasses, mostly through water uptake. Dwell times in chillers typically last from 15 minutes to several hours, usually depending on carcass size and chiller capacity and efficiency. Birds are typically moved through the chillers via augers, rockers, or a drag process and further movement occurs from air agitation from blowers. Air chilling is typically accomplished by moving the carcasses through a low-temperature room, sometimes containing sprays and fans for evaporative cooling and dips for antimicrobial treatment.

In many plants, following the chilling process, plants may use spray cabinets, dip, or wash applications if desired, optionally with antimicrobials, to help reduce organic and microbial contamination.

Once chilled the carcasses are unloaded from the last chill step and subsequent dips or sprays or further treatments, carcasses can be packaged or additionally processed into other forms such as parts, cuts, ground product. Additional processing may also include chillers, sprays, dips, cascades and other water applications.

It is also desirable for the production of product that the step does not cause moisture loss, and therefore weight loss of any product subjected to antimicrobial treatment. The resulting products are sold by weight. Based on the processing steps, the resulting products have less weight than the live weight of the birds that were slaughtered, based on the loss of poultry components such as feathers, viscera etc. Therefore, it is critical that the processors maximize the weight of the finished product that results from the production process.

The rinsing, washing, and chilling steps of the production process usually results in moisture being added to the products. This results in an increase of weight and yield of the product without the need for additional raw materials, which results in a more sustainable industry with a reduced impact on resources proportional to output.

As used herein, the term "nano-bubble" (NB) refers to a bubble that has a diameter of less than one micron. Nano-bubbles have several unique properties such as long lifetime in liquid due to their negatively charged surfaces. Nano-bubbles also have high gas solubility into the liquid due to their high internal pressure. Conversely, micro- and macro-bubbles are larger in size, and thus rise rapidly and burst at the water surface.

US 2021 0337834 A1 showed that the addition of nano-bubbles (NB) to an antimicrobial solution can increase the antimicrobial efficacy in food product processing. For the poultry industry, any changes in processing may impact product quality, which includes organoleptic properties like color, taste, texture, and weight. Any change with negative implications on profit or quality can preclude the use of technology.

US 2012 0183664 A1 relates to seasoning food by subjecting the food to processing with a liquid seasoning using a micro-nanobubble generating device, to impregnate the food with the liquid seasoning.

In U.S. Pat. No. 10,591,231 B2 a nano-bubble generator is described, producing a composition comprising nano-bubbles dispersed in a liquid-carrier such as water.

It was therefore an object of the present invention to provide a method of treating a food product for increasing the weight of the food product.

SUMMARY OF THE INVENTION

After thorough investigation, the inventors of the present invention have surprisingly found that a method of treating a food product for increasing the weight of the food product as defined herein solves the above technical problem as it provides a method for treatment of food products with increase of weight without effecting the quality of the food product negatively, especially the organoleptic properties.

In the present invention, it was surprisingly found that a method of treating a food, wherein the food product is selected from a group consisting of: animal carcass, poultry, meat, seafood and parts thereof, said method comprising:

introducing nano-bubbles (NB) into water or an aqueous solution to provide NB-comprising water, contacting the food product with NB-comprising water for a time sufficient to increase the weight of the food product, does increase the weight of the food product.

The increase in the weight is evidenced by a higher weight of the food product after contact with the NB-comprising water in comparison with contact to water or a comparable aqueous solution without NB. This means the weight of the food product is increased itself by treatment with the NB-comprising water in addition to usual weight increase by known treatment with water without NB. Therefore, the increase of weight is independent from free, surrounding water, which can be removed easily, for example, by draining of or swapping of the water. Therefore, the increase of the weight of the food product is a real weight increase derived from uptake of substances in the food product, for example uptake of water in parts of the food product such as tissue, fibers, muscles, cells of poultry carcasses or parts thereof.

DETAILED DESCRIPTION OF THE INVENTION

Figure 1:
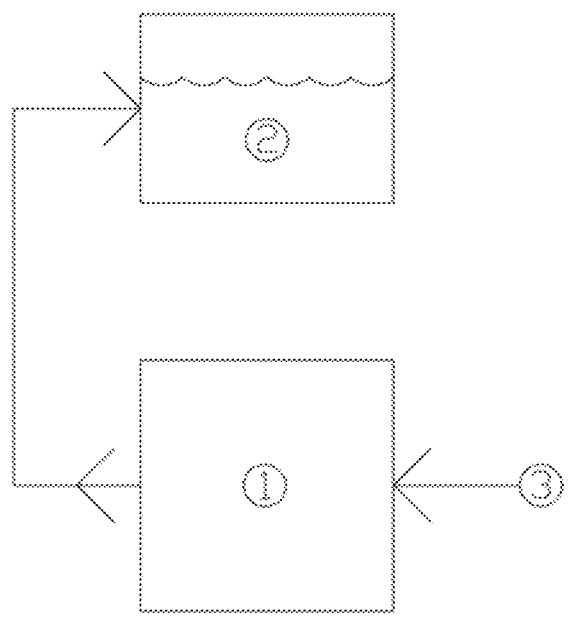
FIG. 1—First optional embodiment, wherein infeed water is treated by NB-generator and used in a dip or chiller application site.

The present invention relates to a method of treating a food product for increasing the weight of the food product, wherein the food product is selected from a group consisting of: an animal carcass, poultry, meat, seafood and parts thereof, said method comprising:

introducing nano-bubbles (NB) into water or an aqueous solution to provide NB-comprising water and contacting the food product with NB-comprising water for a time sufficient to increase the weight of the food product.

Increase in the weight is evidenced by a higher weight of the food product after contact with the NB-comprising water in comparison with contact to water alone or a comparable aqueous solution without NB. This means the weight of the food product is increased itself by treatment with the NB-comprising water more than water alone and without involving free, surrounding water, which can be removed easily by for example draining of the water. In particular, for defining the increase in the weight, the contact with the NB-comprising water and the contact to water alone or a comparable aqueous solution without NB may be carried out for the same time. The increase in the weight may be expressed per a given unit of time, if desired.

The NB-comprising water can be just water comprising nano-bubbles or an aqueous solution comprising beside nano-bubbles several other ingredients, which are part of the food product processing process.

Preferably, the NB-comprising water maintains NB during the contact time with the food product, to ensure the contact of the food product with NB-comprising water and the increase of weight of the food product. This includes the reduction of the concentration of NB within the NB-comprising solution, however some NB will maintain during the total contact time of the NB-comprising water with the food product.

In an optional embodiment the nano-bubbles are introduced into water or an aqueous solution by treatment of the water or aqueous solution with a nano-bubbles generator, for example such as described by Moleaer Inc. in U.S. Pat. No. 10,591,231 B2 or WO 2017156410 A1. This enables an energy saving and cost-efficient method for generating a NB-comprising water.

In an alternative embodiment the nano-bubbles are introduced into water or an aqueous solution by one of the following methods, for example: swirl-type liquid flow, venturi, high-pressure dissolution, ejector, mixed vapor direct contact condensation and supersonic vibration.

In an optional embodiment, the composition is essentially free of microbubbles when measured 10 minutes after emerging from a liquid outlet of the NB-generator or 10 min after taking a sample of the NB-comprising water. A composition that is "essentially free of microbubbles" is a composition in which microbubbles make up less than 1% of the total bubble volume in the composition. Based on the application and movements it can be possible that microbubbles or even larger bubbles are inserted into the NB-comprising water. However, these bubbles are not stable dispersed in the NB-comprising water and will escape fast.

The NB have a diameter less than 1000 nm, as this is the definition of NB.

Optionally, the NB in the NB-comprising water may have a mean diameter less than 500 nm or less than 200 nm or ranging from about 10 nm to about 500 nm, even more optionally from about 75 nm to about 200 nm. In a further optional embodiment, the concentration of nano-bubbles in the NB-comprising water may be at least $1\times10^6$ nano-bubbles/ml, at least $1\times10^7$ nano-bubbles/ml, or at least $1\times10^8$ nano-bubbles/ml.

The aqueous solution or NB-comprising water comprises mostly water and can comprise further ingredients such as antimicrobial substances, oxidants, pH adjustment agents, processing aids, antioxidants, buffers. Especially, any substance can be used in the NB-comprising water, which is/are permitted in poultry processing by country specific law regulations. For example, the ingredients permitted in US for poultry processing are listed in "United States Department of Agriculture, Food Safety and Inspection Service. Safe and Suitable Ingredients Used in the Production of Meat, Poultry, and Egg Products. FSIS Directive 7120.1 Revision 57. The further ingredients can be selected as useful for the food product process. For example, antimicrobial substances reduce the organic and microbial content on the surface of the food product and the treatment solutions, such as NB-comprising water.

The water used for providing an aqueous solution or the NB-comprising water is optionally usual tap or plant water, preferably without further special treatment such as electrolyzed water. Using regular available water reduces the cost for the supply of water. Alternative, if needed also electrolyzed water could be used.

Poultry processing waters and aqueous solutions may be treated with a variety of chemistries, or no added chemistries at all. Examples of commonly used chemistries and processing aids used in the same areas as NB treated water include those found in categories of acidifiers/alkalizers, antimicrobials, and poultry scald of the USDA Safe and Suitable Ingredients as cited above.

Optionally, the food product is selected from the group consisting of carcasses, parts or cut products of poultry. The poultry is preferably selected from the group of chicken, duck, turkey, goose, ostrich, pheasant, quail, and squabs.

In a further embodiment the contact of the food product with NB-comprising water is performed by addition of the food product into a tank or reservoir filled with NB-comprising water, dipping the food product into NB-comprising water, deluge the food product with NB-comprising water, rinse the food product with NB-comprising water or spray the food product with NB-comprising water. These treatment methods are usually already implemented into a food product processing tank for water or aqueous solution and may be applied for NB-comprising water without major structural replacements.

In a further embodiment, contacting the food product with NB-comprising water may be performed as separate application beside the known processing steps. This would allow a precise control of the treatment of the food product with NB-comprising water. Optionally, a new compartment, e.g. tank or reservoir, can be incorporated for application of NB-comprising water.

Optionally, the NB-comprising water is introduced or added to a reservoir or tank by a water supply of NB-comprising water. For example, the NB-comprising water can be produced outside the food production plant, transported into tanks and provided to the food product processing plant, especially the application point, such as a reservoir or tank for application.

In an optional embodiment the NB-comprising water is introduced or added to a tank, reservoir or water supply by a NB-generating apparatus, also called nano-bubble generator, located within or attached to the water reservoir, tank or water supply. This allows a possibility to produce NB-comprising water within the food product processing plant.

In a further optional embodiment, the NB-comprising water is provided into a tank or reservoir, wherein the food product is contacted with the NB-comprising water, and the NB-comprising water is recirculated by a loop, which leads the NB-comprising water out of the tank or reservoir and passes NB-comprising water into the tank or reservoir or into another tank or reservoir. This reduces the amount of needed NB-comprising water. This could be performed again and again, with several tanks/reservoirs in series.

The water, from the tank or reservoir into the loop might be already used for treatment of the food product. After passing the loop it can be passed again into the tank or reservoir. The NB-comprising water is optionally regenerated within the loop, for example by contacting the used NB-comprising water with a nano-bubbles generator to increase the NB content of the already used NB-comprising water or to maintain a predefined range of NB content in the NB-comprising water. In a further optional embodiment, the used NB-comprising water might be treated with an antimicrobial. In a further optional embodiment, the used NB-comprising water can be mixed with fresh NB-comprising water, wherein the fresh NB-comprising water was not used for food product treatment before. These embodiments further reduce the amount of needed NB-comprising water.

In an alternative embodiment, the NB-comprising water is provided by melting NB-comprising ice or by supplying NB-comprising ice in a water supply. The NB-comprising water is optionally introduced or added to the tank or reservoir, wherein the NB-comprising water has been frozen and is added to the body of water by the addition of NB-comprising ice. This offers a possibility to provide NB-comprising water, which is produced outside the food product processing plant and is transported to the location of application.

In a further optional embodiment, the NB-comprising water and the food product are contacted in a continuous process. Optionally, the NB-comprising water and/or the food product are transferred by pump, gravity, overflow, or mechanical process to another process step of the food product treatment process. For example, the water from a body of water comprising NB-comprising water, which is for example provided in the tank or reservoir, is transferred by pump, gravity, overflow, or mechanical process to another body of water in another tank or reservoir that will come in contact with food product receiving the transferred water concurrently or at a later time. Therefore, the NB-comprising water can be used several times for many food product charges and resources are saved.

Preferably, the NB-comprising water used for the contact treatment of the food product has a pH from about 1 to about 13 while contacting with the food product, preferably 3 to 11. Therefore, the pH can be used as needed for the relevant treatment stage, e.g. the pH for antimicrobial dips or sprays is preferably about 3, whereas the pH in chillers is applied up to 12.

In some preferred embodiments, the NB-comprising water has a pH of from about 1 to about 4, more preferably of from about 2 to about 3. In some other preferred embodiments, the NB-comprising water has a pH of from about 9 to about 12, more preferably of from about 10 to about 11. It has been surprisingly found that adjusting the pH to the aforementioned ranges by using acid or base provides a synergistic effect together with the nanobubbles (NB) on the weight increase of the food product. Accordingly, the present invention also relates to a method of treating a food product for increasing the weight of the food product, wherein the food product is selected from a group consisting of: an animal carcass, poultry, meat, seafood and parts thereof, said method comprising:

introducing Nano Bubbles (NB) into water or an aqueous solution to provide NB-comprising water and contacting the food product with NB-comprising water for a time sufficient to increase the weight of the food product, wherein the NB-comprising water has a pH from about 1 to about 4 or from about 9 to about 12. Such pH values are commonly used in food processing, such as e.g. poultry processing. The pH can be readily adjusted by using acid or base, e.g. by using any acid or base as described herein, such as e.g. sodium hydroxide, or a mixture of sulfuric acid, phosphoric acid and citric acid, such as e.g. FxLP. In some embodiments, the NB-comprising water has a pH from about 1 to about 4, preferably from about 2 to about 3, and the pH is adjusted by using an acid. Any suitable acid may be used. In particular, the acid may be selected from the group consisting of hydrochloric acid, sulfuric acid, citric acid, phosphoric acid, lactic acid and any combination thereof. Preferably, the acid is selected from the group consisting of sulfuric acid, phosphoric acid and citric acid and any combination thereof. More preferably, the acid is a mixture of sulfuric acid, phosphoric acid and citric acid, such as e.g. FxLP. In some embodiments, the NB-comprising water has a pH from about 9 to about 12, preferably from about 10 to about 11, and the pH is adjusted by using a base. Any suitable base may be used. In particular, the base may be selected from the group consisting of sodium hydroxide, potassium hydroxide, sodium bicarbonate, sodium carbonate, and any combination thereof. Preferably, the base is selected from the group consisting of sodium hydroxide, potassium hydroxide and any combination thereof. More preferably, the base is sodium hydroxide.

The term pH here refers to a value determined by measurement with an electrode employing a commercial PH meter calibrated to aqueous buffer solutions of known pH for measuring dilute aqueous solutions. Usually, this pH is called the apparent pH, which differs from the pH measured in pure water. The apparent pH differs from the notional pH, i.e. the negative logarithm of the hydrogen ion activity, by a constant value because the normal potential of an electrode in the aqueous phase of the NB-comprising water might be different than the normal potential in pure water. For measuring the pH, optionally pH test strips, a pH-meter or pH electrodes with controller can be used.

Optionally, the NB-comprising water also comprises an antimicrobial substance. In preferred embodiments, the NB-comprising water comprises the antimicrobial substance in an amount of from about 1 ppm to about 2000 ppm, more preferably of from about 20 ppm to about 1000 ppm, still more preferably of from 30 ppm to about 600 ppm. In some embodiments, the NB-comprising water comprises the antimicrobial substance in an amount of from about 1 ppm to about 20 ppm, or from about 1 ppm to about 10 ppm. Low concentrations of an antimicrobial substance in NB-comprising water may occur, e.g., when processing a food product, that was treated in a first bath with the antimicrobial substance but substantially without nanobubbles, into a second bath containing NB-comprising water but substantially no antimicrobial substance(s). The low concentration in the second bath containing NB-comprising water may then result from a carry over of the antimicrobial substance from the first to the second bath.

It has been surprisingly found that an antimicrobial substance provides a synergistic effect together with the nanobubbles (NB) on the weight increase of the food product. An antimicrobial substance, as used in embodiments of the invention, may be selected from, but not limited to the group consisting of peracetic acid, hypochlorite, acidified sodium chlorite and any combination thereof. Accordingly, the present invention also relates to a method of treating a food product for increasing the weight of the food product, wherein the food product is selected from a group consisting of: an animal carcass, poultry, meat, seafood and parts thereof, said method comprising:

introducing Nano Bubbles (NB) into water or an aqueous solution to provide NB-comprising water and contacting the food product with NB-comprising water for a time sufficient to increase the weight of the food product, wherein the NB-comprising water comprises peracetic acid, hypochlorite and/or acidified sodium chlorite.

Optionally, the NB-comprising water comprises peracetic acid in an amount up to 200 ppm, more optionally in an amount from about 1 ppm to 2000 ppm. In some embodiments, the NB-comprising water comprises peracetic acid in an amount of from about 20 ppm to about 1000 ppm, preferably of from about 30 ppm to about 600 ppm. In other embodiments, the NB-comprising water comprises peracetic acid in an amount of from about 1 ppm to about 20 ppm, or from about 1 ppm to about 10 ppm. Peracetic acid is an antimicrobially-active substance.

In a further optional embodiment, the NB-comprising water comprises hypochlorite, preferably in an amount of up to 50 ppm. In some embodiments, the NB-comprising water comprises hypochlorite in an amount of from about 1 ppm to about 2000 ppm, preferably of from about 20 ppm to about 1000 ppm, more preferably of from about 30 ppm to about 600 ppm. In other embodiments, the NB-comprising water comprises hypochlorite in an amount of from about 1 ppm to about 20 ppm, or from about 1 ppm to about 10 ppm.

In an alternative embodiment the NB-comprising water comprises acidified sodium chlorite, preferably in an amount of up to 500 ppm. In some embodiments, the NB-comprising water comprises acidified sodium chlorite in an amount of from about 1 ppm to about 2000 ppm, preferably of from about 20 ppm to about 1000 ppm, more preferably of from about 30 ppm to about 6500 ppm. In other embodiments, the NB-comprising water comprises acidified sodium chlorite in an amount of from about 1 ppm to about 20 ppm, or from about 1 ppm to about 10 ppm.

Applications vary in PH levels throughout processing, according to the use and purpose of the application. For example, applications containing concentrated levels of acid for antimicrobial effect will have a lower pH, preferably a pH about 2 to 6, and processes intended mostly for chilling and quality purposes may have more neutral or basic pH levels, preferably a pH about 7 to 12 pH, more preferably up to 12.

Optionally, the NB-comprising water does not comprise chlorine or any chlorinated compounds.

In an alternative embodiment, the NB-comprising water comprises hypochlorite or acidified chlorite, for example acidified sodium chlorite, wherein the amount of hypochlorite is preferably 1 to 100 ppm. Preferably the amount of acidified chlorite is 1 to 600 ppm.

In a further optional embodiment the NB-comprising water comprises an acid selected from the group containing of hydrochloric acid, sulfuric acid, citric acid, phosphoric acid, lactic acid and mixtures thereof. The acid enables the adjustment of the pH of the NB-comprising water depending on the application location within the food product processing.

Optionally, the acid is used in a sufficient amount to adjust the pH, more optionally to adjust the pH to 1.4 to 2.5.

In an alternative embodiment the NB-comprising water comprises a basic solution selected from the group of sodium hydroxide, potassium hydroxide, sodium bicarbonate, sodium carbonate, mixtures thereof or any other of the alkalizers listed in the USDA list, as cited above.

The caustic enables the adjustment of the pH of the NB-comprising water.

Optionally the NB-comprising water further comprises stabilizers, for example 1-hydroxy ethylidene-1,1-diphosphonic acid (HEDP) and 2,6-pyridinedicarboxylic acid (DPA). The stabilizers might be provided through the addition of peracetic acid, which is usually stabilized and also comprises hydrogen peroxide and acetic acid from equilibrium of peracetic acid.

In an optional embodiment the temperature of the NB-comprising water while contacting the food product is from about −28° C. to about 60° C. The temperature can be adjusted dependent on the processing step of the food product process, e.g. chilling or scalding. Using NB-comprising water in the scalding processing step may facilitate the scaling process.

Any increase of weight of the food product treated with NB-comprising water is important and increases the financial value of the food product. Optionally, the increase of weight is at least 0.001 wt-%, more optionally 0.01 wt-% or 0.1 wt %, most optionally 1 wt %. The increase of weight of the food product is calculated from the measured weight of food product treated with NB-comprising water in comparison to food product treated with water without NB. In particular, the increase of weight of the food product may be defined as the difference between the weight of the food product treated with NB-comprising water and the weight of the food product treated with water without NB under substantially identical conditions. In particular, for defining the increase of weight, the treatment of the food product with NB-comprising water and the treatment of the food product with water without NB may be carried out for the same time. The increase of weight may be expressed per a given unit of time, if desired. In accordance with the present disclosure, the NB-containing water and the water without NB may comprise further ingredients as described herein, such as e.g. an antimicrobial substance, acid or base, as long as the difference between the NB-comprising water and the water without nanobubbles is substantially only the presence or absence of NB.

A further optional aspect of the invention is the contacting time of the food product with the NB-comprising water, whereas the contacting occurs preferably at least for 1 minute.

Optionally, the food product is contacted with the NB-comprising water for at least 1 minute up to several hours, more optionally up to 4 or 6 hours.

In an optional embodiment the nano-bubbles comprise a gas selected from the group consisting of: air, carbon dioxide, oxygen, nitrogen, ozone, hydrogen, and combinations thereof. Preferably any gas can be used, which can be used to form nano-bubbles. More preferably, the used gas does not affect the food product negatively and is allowed for food product application by country specific regulations. Optionally, the gas used for provision of NB-comprising water is a mixture of air and oxygen, wherein the mixture may comprise up to 92 vol % oxygen.

The present invention also relates to a use of NB-comprising water for increasing the weight of a food product, wherein the food product is selected from a group consisting of: an animal carcass, poultry, meat, seafood and parts thereof, said use comprising:
 introducing Nano Bubbles (NB) into water or an aqueous solution to provide NB-comprising water and
 contacting the food product with NB-comprising water for a time sufficient to increase the weight of the food product.

In embodiments, the use is as further defined herein, in particular as defined herein with regard to any method described herein.

DETAILED DESCRIPTION OF THE DRAWINGS

FIG. 1 shows a first optional embodiment, wherein infeed water is treated by NB-generator (1) to provide NB-comprising water, which is used in an application site (2) for contact of the NB-comprising water with the food product. The application site (2) is here shown as a tank or reservoir used, for example, for a dip or chiller application. The water or aqueous solution or NB-comprising water is optionally pumped from one component to the other component using for example pumps, which are not shown in the figures.

Figure 2:
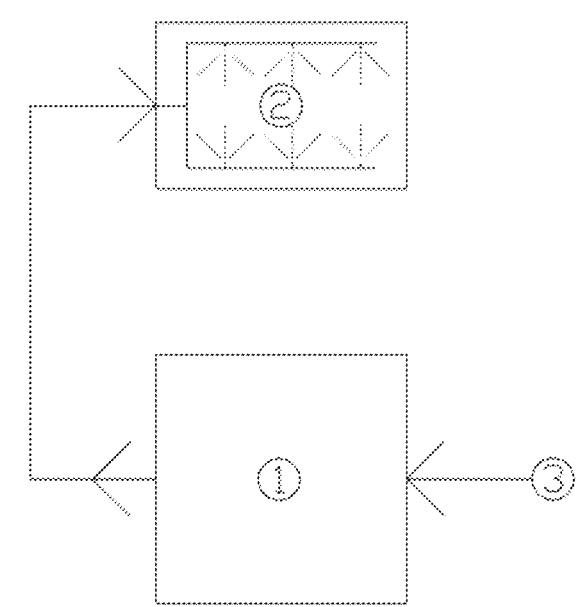
FIG. 2—Second optional embodiment, wherein infeed water is treated by NB-generator and used in a spray/cascade/deluge application site.

In FIG. 2 a second optional embodiment is shown, wherein infeed water is treated by NB-generator (1) and provided to the application site (2), which is here drawn as a spray/cascade/deluge application.

Figure 3:
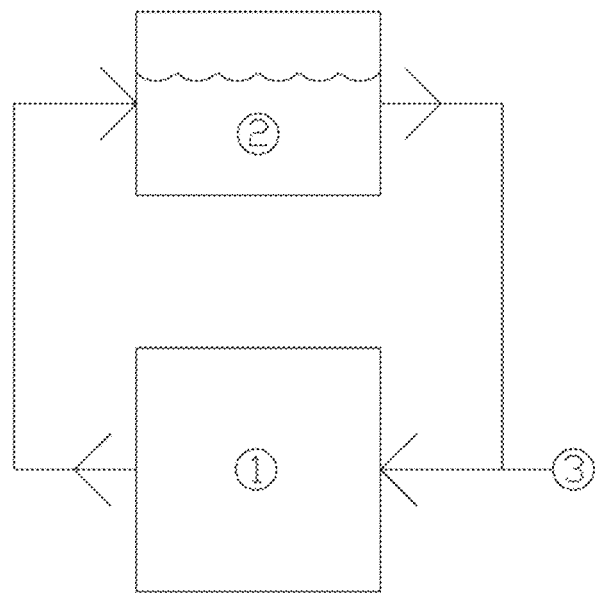
FIG. 3—Third optional embodiment, wherein infeed water is treated by NB-generator and used in an application site, wherein infeed water is primarily sourced from application.

FIG. 3 shows a third optional embodiment, wherein infeed water is treated by NB-generator (2) and used in an application site (2). The used and still NB-comprising water is sourced from the application site (2) and regenerated using an NB-generator (1) for further treatment and contact of further food product in the application site (2). Additional non-NB-treated water may be added during the application to replace water carried out by product during processing.

Figure 4:
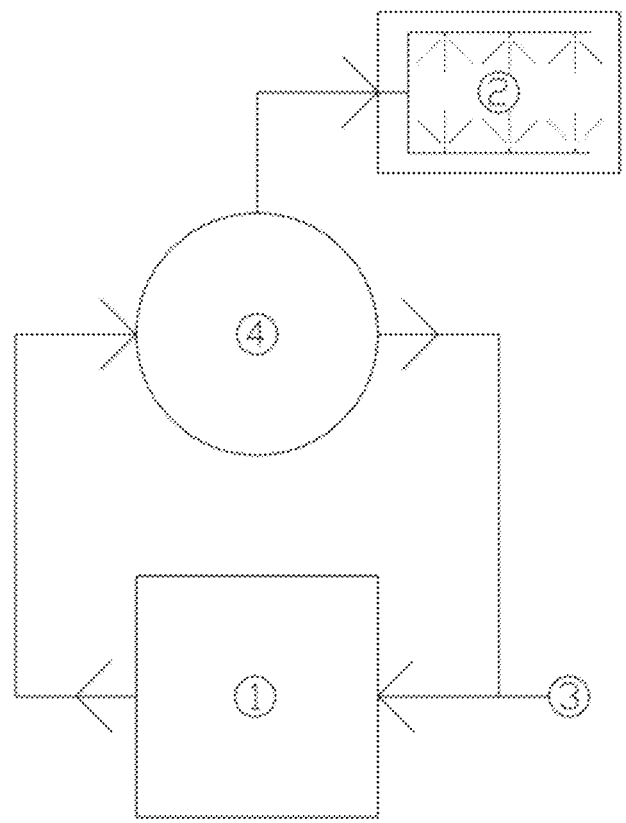
FIG. 4—Fourth optional embodiment, wherein infeed water is treated by NB-generator and transported to a non-application reservoir. Non-application reservoir is used to supply NB-comprising water to application.

In FIG. 4 a fourth optional embodiment is shown, wherein infeed water is treated by a NB-generator (1) to provide NB-comprising water. The NB-comprising water is transported to a non-application reservoir (4).

The non-application reservoir (4) is used to supply NB-comprising water to application site (2).

Figure 5:
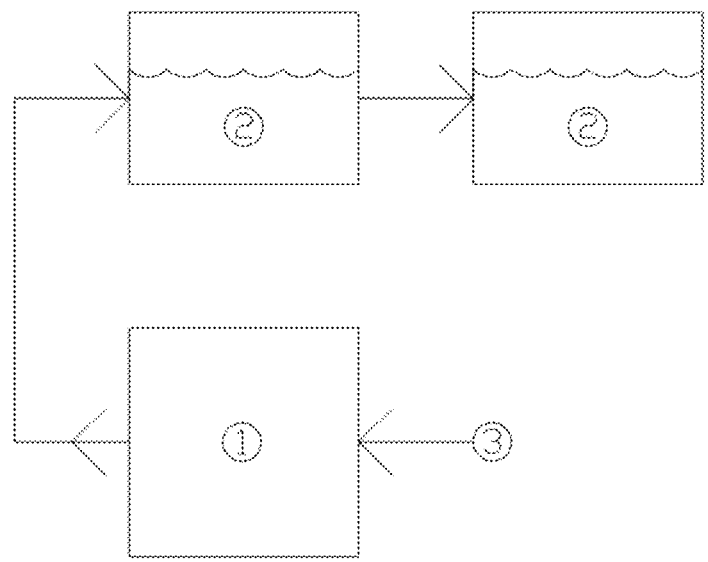
FIG. 5—Fifth optional embodiment, wherein infeed water treated by NB-generator and used in application site. Additional application(s) is supplied from initial application.

FIG. 5 shows a fifth optional embodiment, wherein infeed water is treated by N-generator (1) to provide NB-comprising water, which is used in application site (2) for contact with a food product. Additional one or more application t (2) are supplied from initial application site (2). In other words, the NB-comprising water is used in more than one tank or reservoir as application site (2). Optionally, the NB-comprising water is used for several application sites and provided in a countercurrent manner in comparison of the food product treatment, for example using several tanks or reservoirs as chillers.

In every shown optional embodiment the NB-generator (1) and application site (2) could be directly connected to each other, wherein the NB-comprising water is optionally transported by pumps. Alternatively, the NB-comprising water provided by treatment of water or aqueous solution using a NB-generator (1) could optionally be transported from one location to another and provided to the application site (2), even in form of ice, frozen using NB-comprising water.

Figure 6:
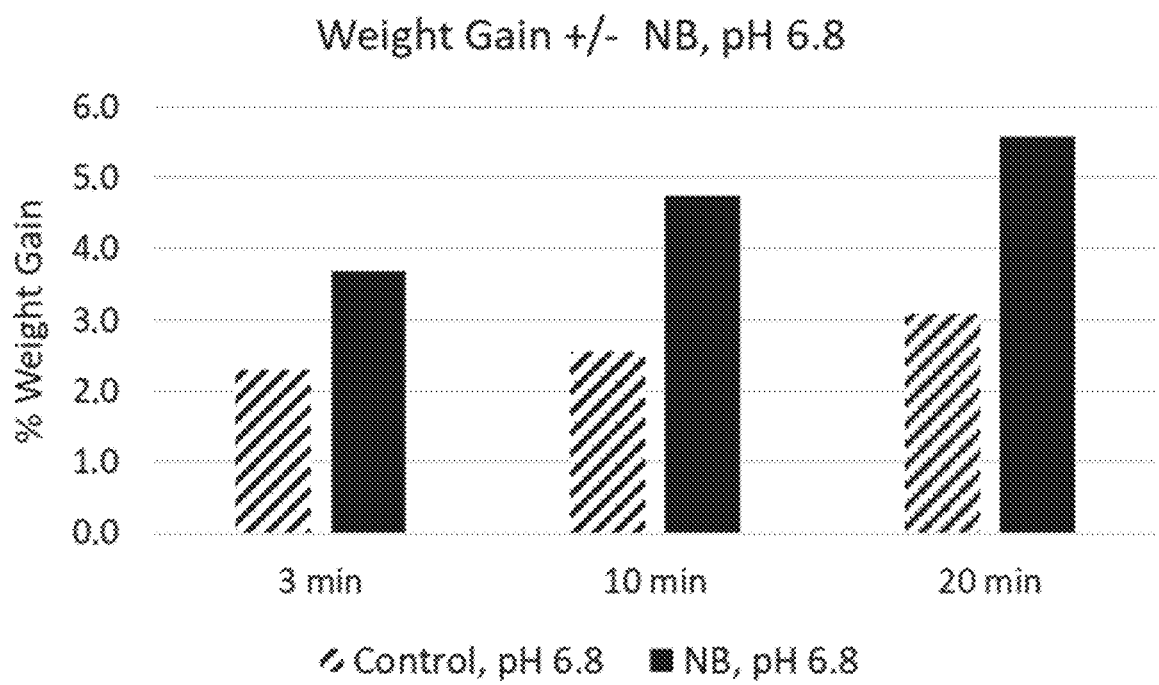
FIG. 6—Effect of NB on weight increase.

FIG. 6 depicts the data of Example 1 relating to the effect of NB on weight increase, as provided in Table 1. The average % weight increase for cut poultry breast meat is shown as a function of time in the absence (Control) or presence (NB) of NB. The data are expressed as an average of three separate trials for each of the Control or NB sets of results. The % weight increase is expressed as the ((weight of the poultry at the indicated times divided by the weight of the poultry at time 0)−1)*100.

Figure 7:
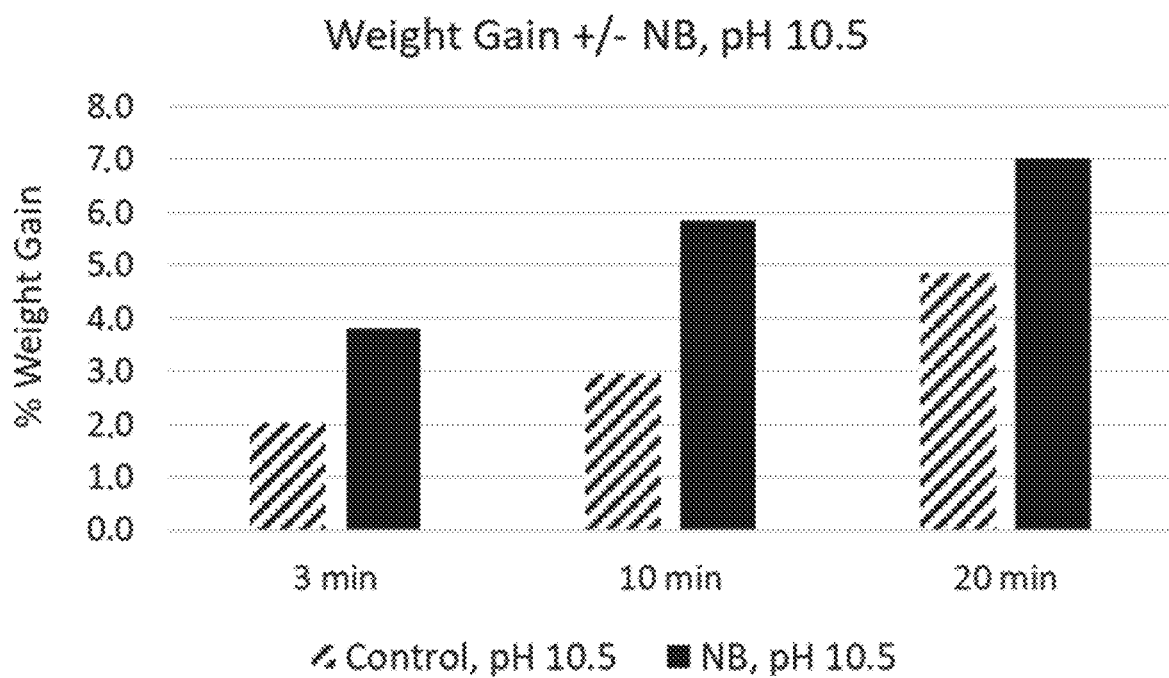
FIG. 7—Effect of NB on weight increase.

FIG. 7 depicts the data of Example 2 relating to the effect of NB on weight increase, as provided in Table 2. The average % weight increase for cut poultry breast meat is shown as a function of time in the absence (Control) or presence (NB) of NB at a pH of 10.5. The data are expressed as an average of three separate trials for each of the Control or NB sets of results. The % weight increase is expressed as the ((weight of the poultry at the indicated times divided by the weight of the poultry at time 0)−1)*100.

Figure 8:
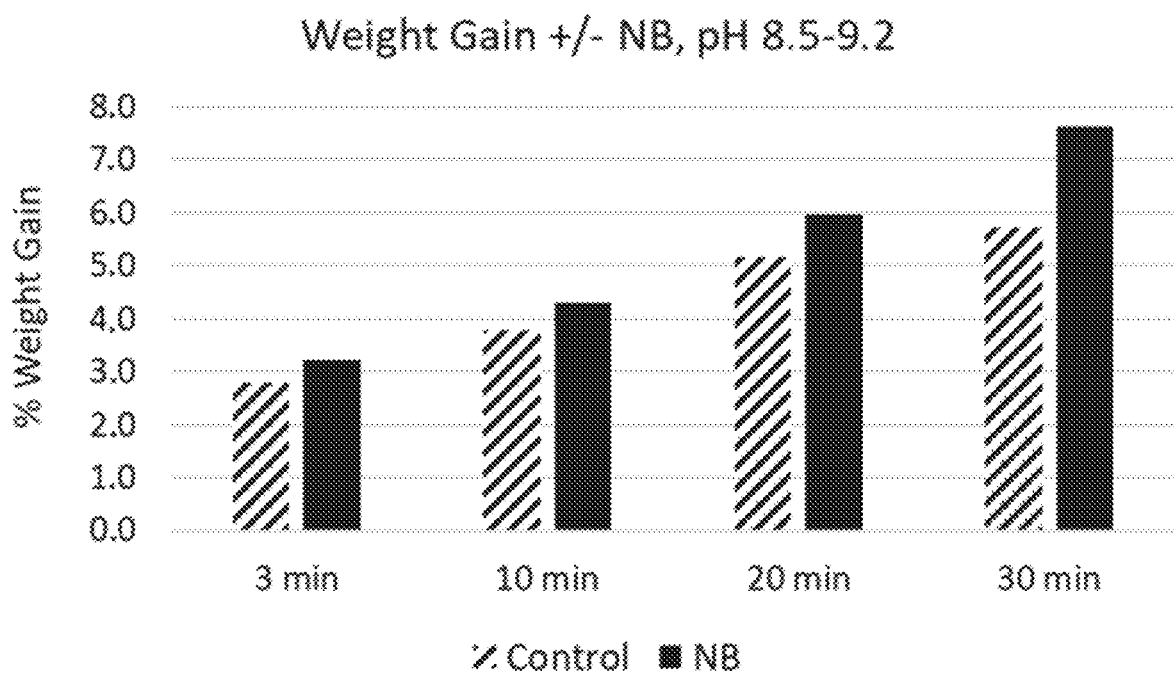
FIG. 8—Effect of NB on weight increase.

FIG. 8 depicts the data of Example 3 relating to the effect of NB on weight increase, as provided in Table 3. Average % weight increase for cut poultry breast meat is shown as a function of time in the absence (Control) or presence (NB) of NB at a pH of 8.5 to 9.2. The data are expressed as an average of three separate trials for each of the Control or NB sets of results. The % weight increase is expressed as the ((weight of the poultry at the indicated times divided by the weight of the poultry at time 0)−1)*100.

Figure 9:
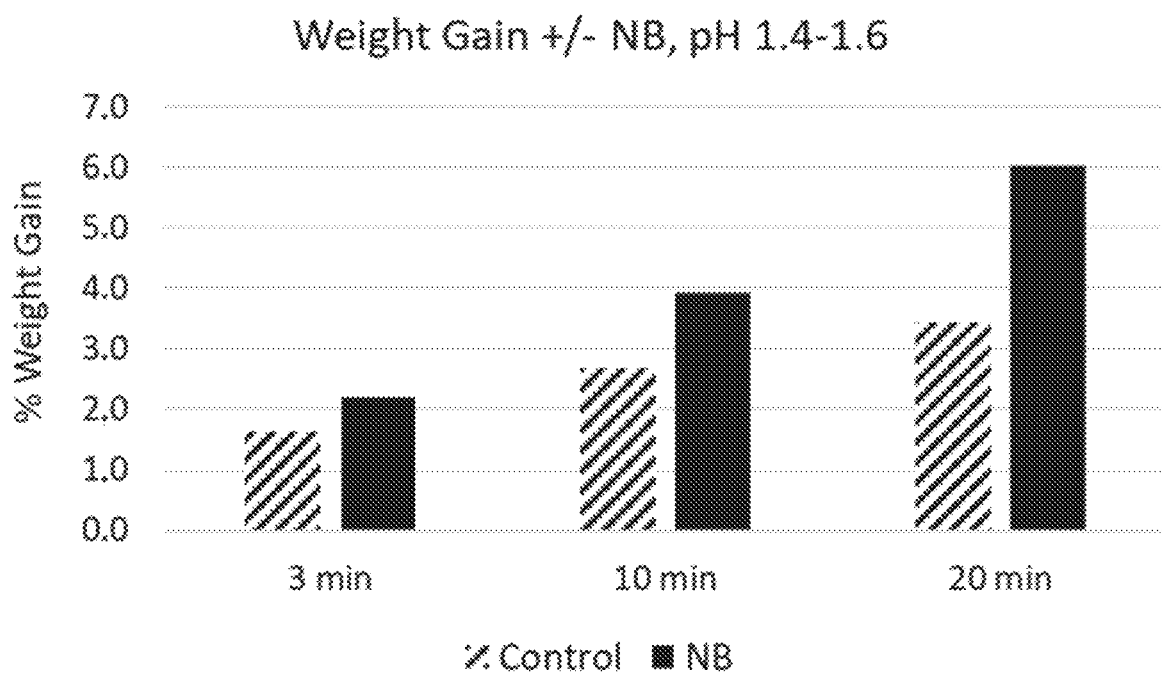
FIG. 9—Effect of NB on weight increase.

FIG. 9 depicts the data of Example 4 relating to the effect of NB on weight increase, as provided in Table 4. The average % weight increase for cut poultry breast meat is shown as a function of time in the absence (Control) or presence (NB) of NB at a pH of 1.4 to 1.6 in the presence of a mixed acid blend of sulfuric, phosphoric, and citric acids (FreshFx LP). The data are expressed as an average of three separate trials for each of the Control or NB sets of results. The % weight increase is expressed as the ((weight of the poultry at the indicated times divided by the weight of the poultry at time 0)−1)*100.

Figure 10:
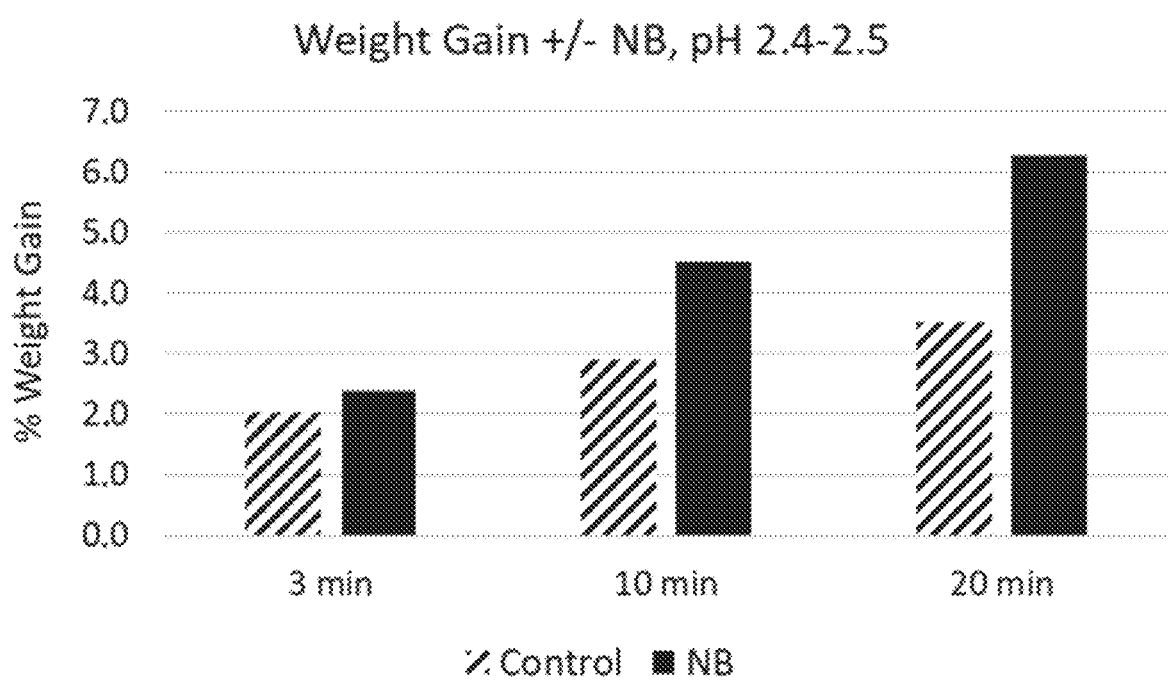
FIG. 10—Effect of NB on weight increase.

FIG. 10 depicts the data of Example 5 relating to the effect of NB on weight increase, as provided in Table 5. The average % weight increase for cut poultry breast meat is shown as a function of time in the absence (Control) or presence (NB) of NB at a pH of 2.4 to 2.5 in the presence of a mixed acid blend of sulfuric, phosphoric, and citric acids (FreshFx LP). The data are expressed as an average of three separate trials for each of the Control or NB sets of results. The % weight increase is expressed as the ((weight of the poultry at the indicated times divided by the weight of the poultry at time 0)−1)*100.

Figure 11:
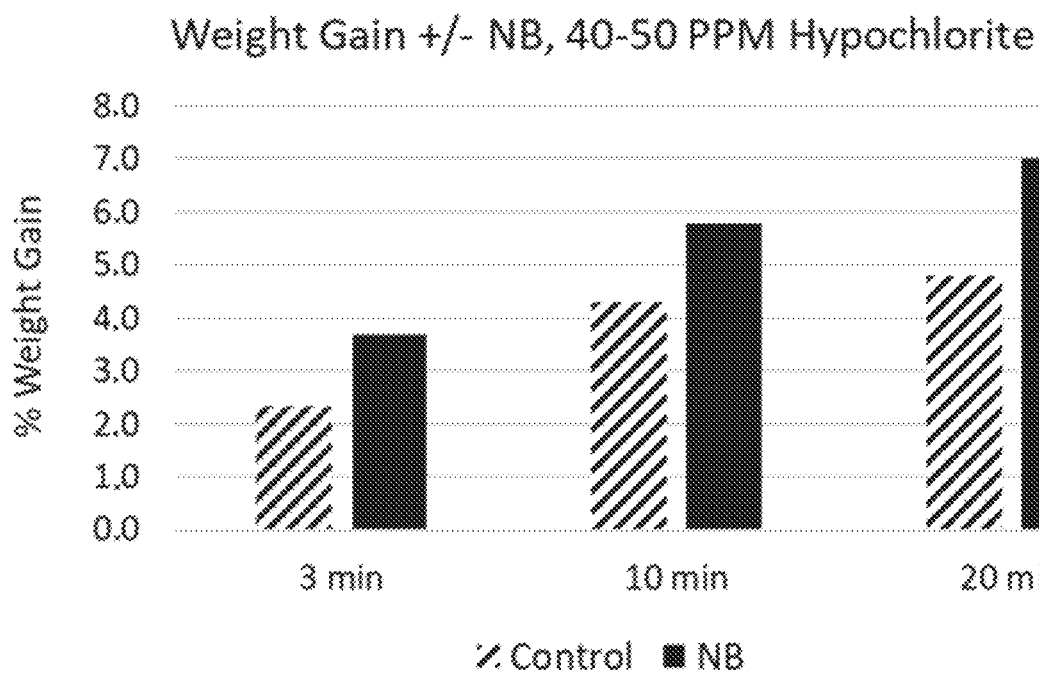
FIG. 11—Effect of NB and hypochlorite on weight increase.

FIG. 11 depicts the data of Example 6 relating to the effect of NB and hypochlorite on weight increase, as provided in Table 6. The average % weight increase for cut poultry breast meat is shown as a function of time in the absence (Control) or presence (NB) of NB in the presence of 45-50 PPM Hypochlorite at a pH of 7.5 to 8. The data are expressed as an average of three separate trials for each of the Control or NB sets of results. The % weight increase is expressed as the ((weight of the poultry at the indicated times divided by the weight of the poultry at time 0)−1)*100.

Figure 12:
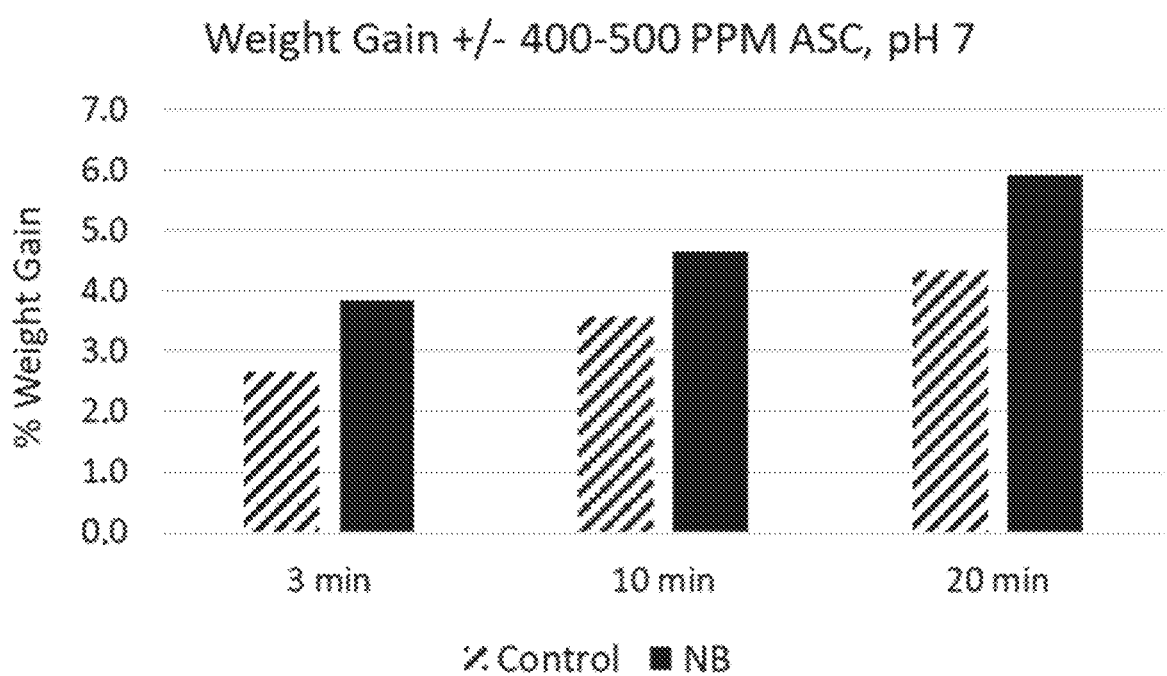
FIG. 12—Effect of NB and acidified sodium chlorite (ACS) on weight increase.

FIG. 12 depicts the data of Example 7 relating to the effect of NB and acidified sodium chlorite (ACS) on weight increase, as provided in Table 7. The average % weight increase for cut poultry breast meat is shown as a function of time in the absence (Control) or presence (NB) of NB in the presence of 400-500 PPM of acidified sodium chlorite (ASC) at a pH of 6.8 to 7.2. The data are expressed as an average of three separate trials for each of the Control or NB sets of results. The % weight increase is expressed as the ((weight of the poultry at the indicated times divided by the weight of the poultry at time 0)−1)*100.

Figure 13:
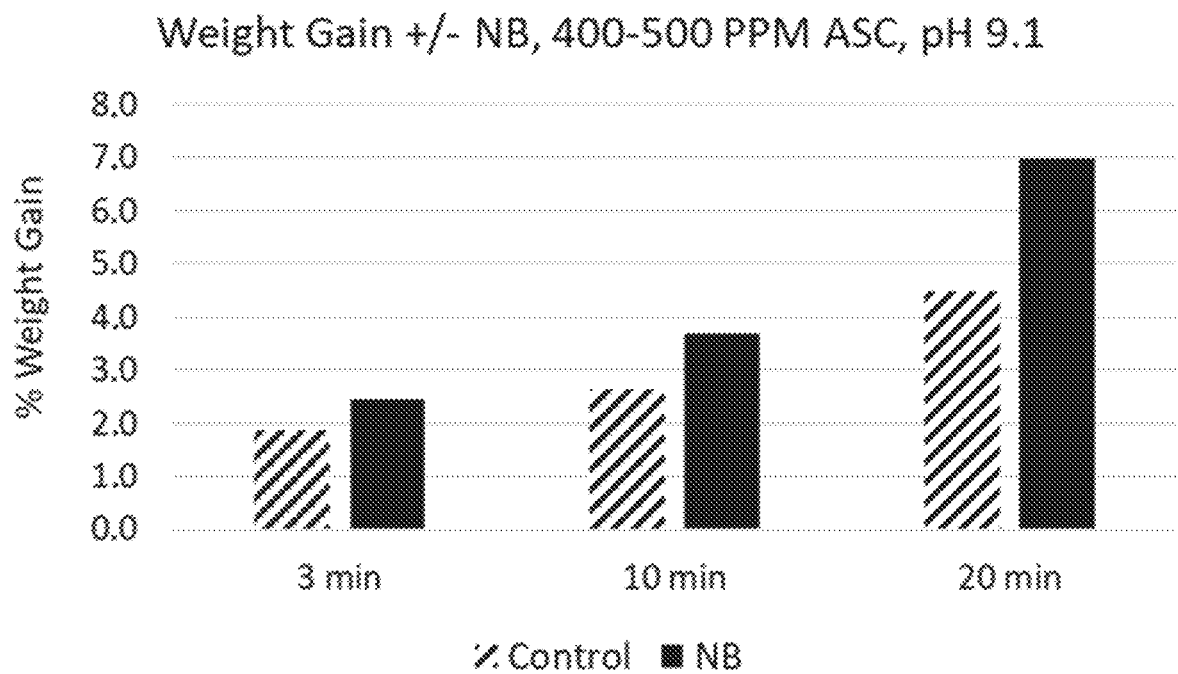
FIG. 13—Effect of NB and acidified sodium chlorite (ACS) on weight increase.

FIG. 13 depicts the data of Example 8 relating to the effect of NB and acidified sodium chlorite (ACS) on weight increase, as provided in Table 8. The average % weight increase for cut poultry breast meat is shown as a function of time in the absence (Control) or presence (NB) of NB in the presence of 400-500 PPM of acidified sodium chlorite (ASC) at a pH of 9.1. The data are expressed as an average of three separate trials for each of the Control or NB sets of results. The % weight increase is expressed as the ((weight of the poultry at the indicated times divided by the weight of the poultry at time 0)−1)*100.

Figure 14:
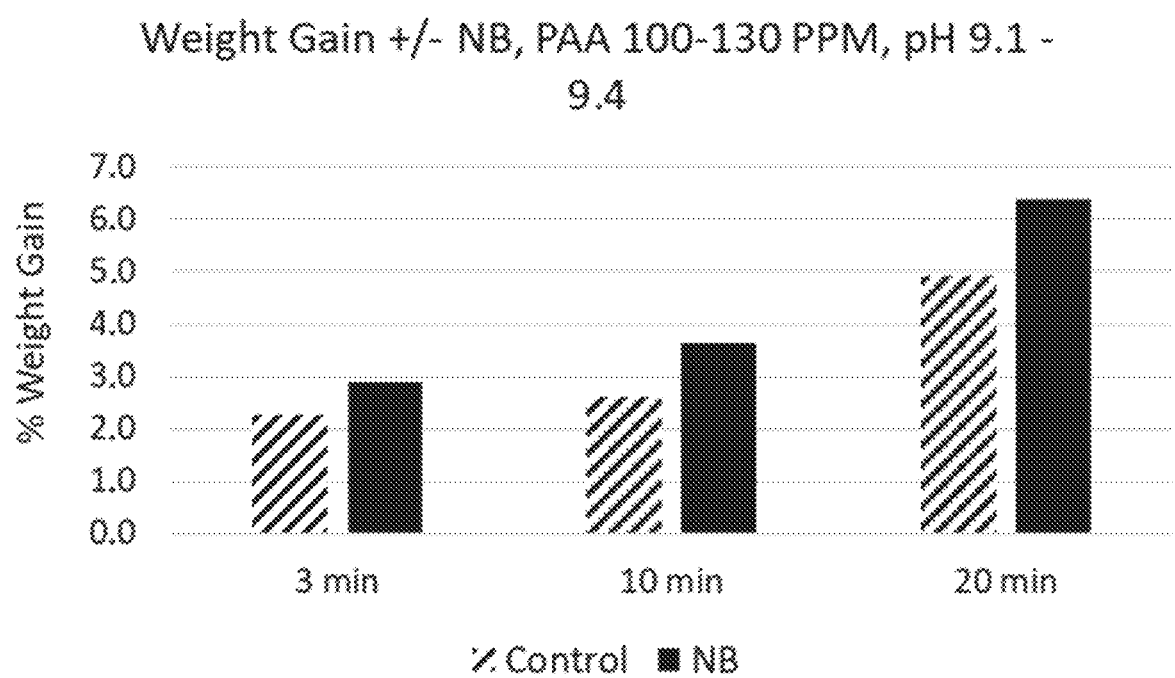
FIG. 14—Effect of NB and peracetic acid (PAA) on weight increase.

FIG. 14 depicts the data of Example 9 relating to the effect of NB and peracetic acid (PAA) on weight increase, as provided in Table 9. The average % weight increase for cut poultry breast meat is shown as a function of time in the absence (Control) or presence (NB) of NB in the presence of 100-130 PPM of peracetic acid (PPA) at a pH of 9 to 9.4. The data are expressed as an average of three separate trials for each of the Control or NB sets of results. The % weight increase is expressed as the ((weight of the poultry at the indicated times divided by the weight of the poultry at time 0)−1)*100.

Figure 15:
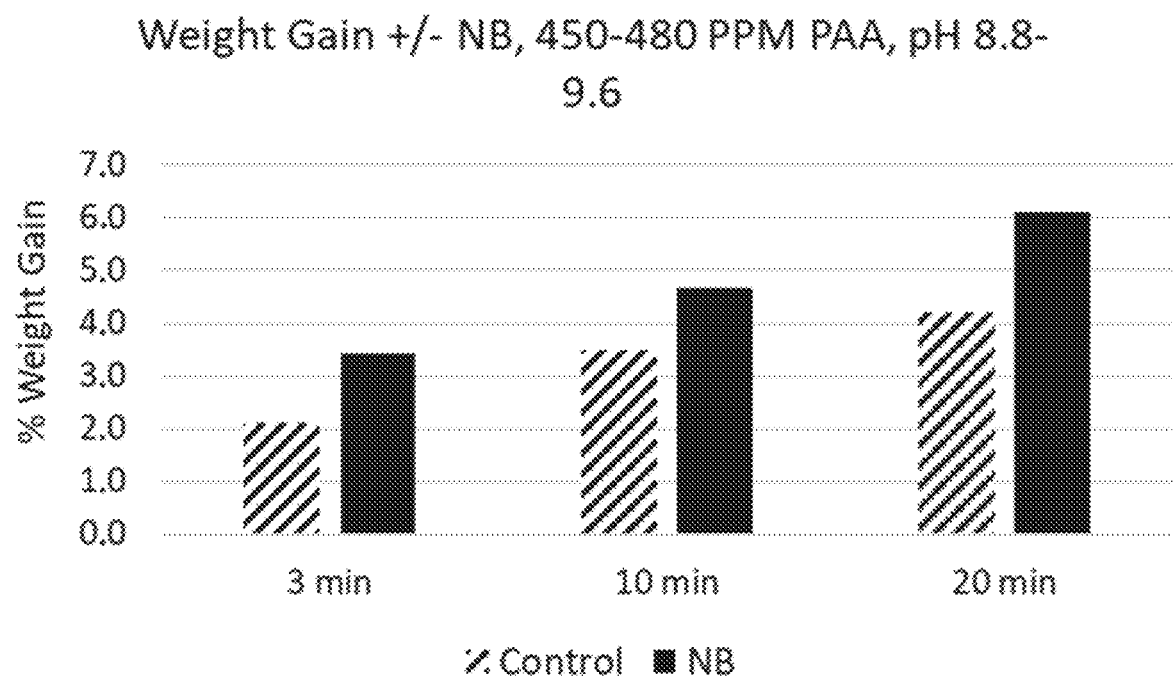
FIG. 15—Effect of NB and peracetic acid (PAA) on weight increase.

FIG. 15 depicts the data of Example 10 relating to the effect of NB and peracetic acid (PAA) on weight increase, as provided in Table 10. The average % weight increase for cut poultry breast meat is shown as a function of time in the absence (Control) or presence (NB) of NB in the presence of 450-480 PPM of peracetic acid (PPA) at a pH of 8.8 to 9.6. The data are expressed as an average of three separate trials for each of the Control or NB sets of results. The % weight increase is expressed as the ((weight of the poultry at the indicated times divided by the weight of the poultry at time 0)−1)*100.

Figure 16:
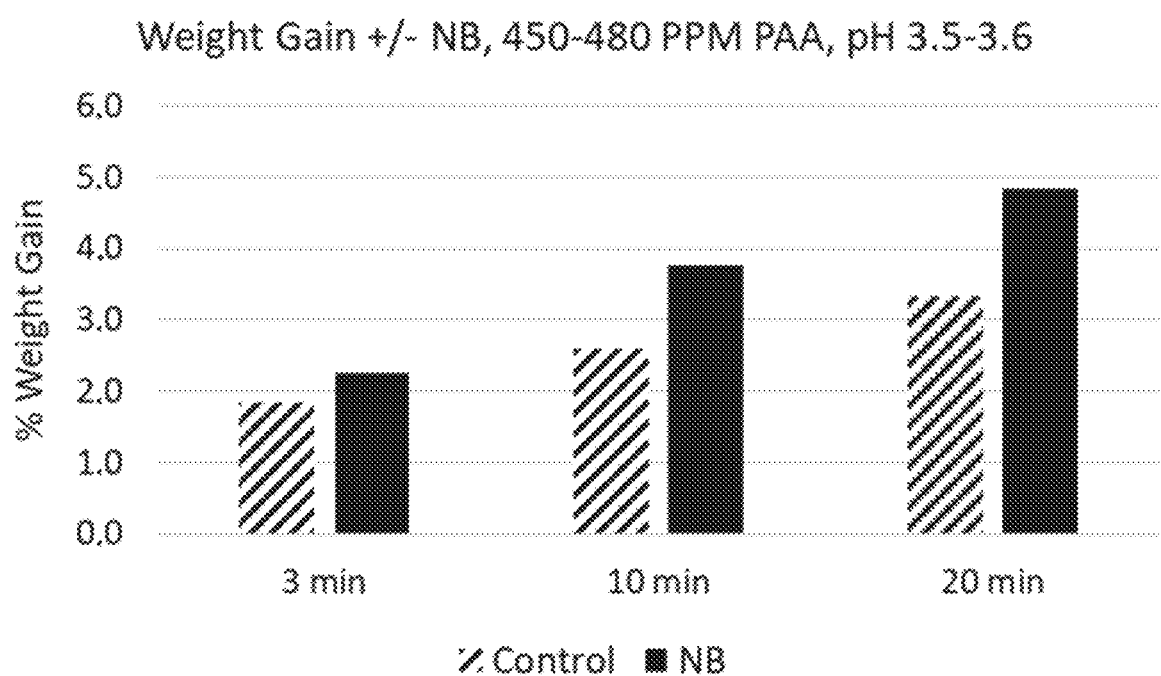
FIG. 16—Effect of NB and peracetic acid (PAA) on weight increase.

FIG. 16 depicts the data of Example 11 relating to the effect of NB and peracetic acid (PAA) on weight increase, as provided in Table 11. The average % weight increase for cut poultry breast meat is shown as a function of time in the absence (Control) or presence (NB) of NB in the presence of 450-480 PPM of peracetic acid (PPA) at a pH 3.5 to 3.6. The data are expressed as an average of three separate trials for each of the Control or NB sets of results. The % weight increase is expressed as the ((weight of the poultry at the indicated times divided by the weight of the poultry at time 0)−1)*100.

Figure 17:
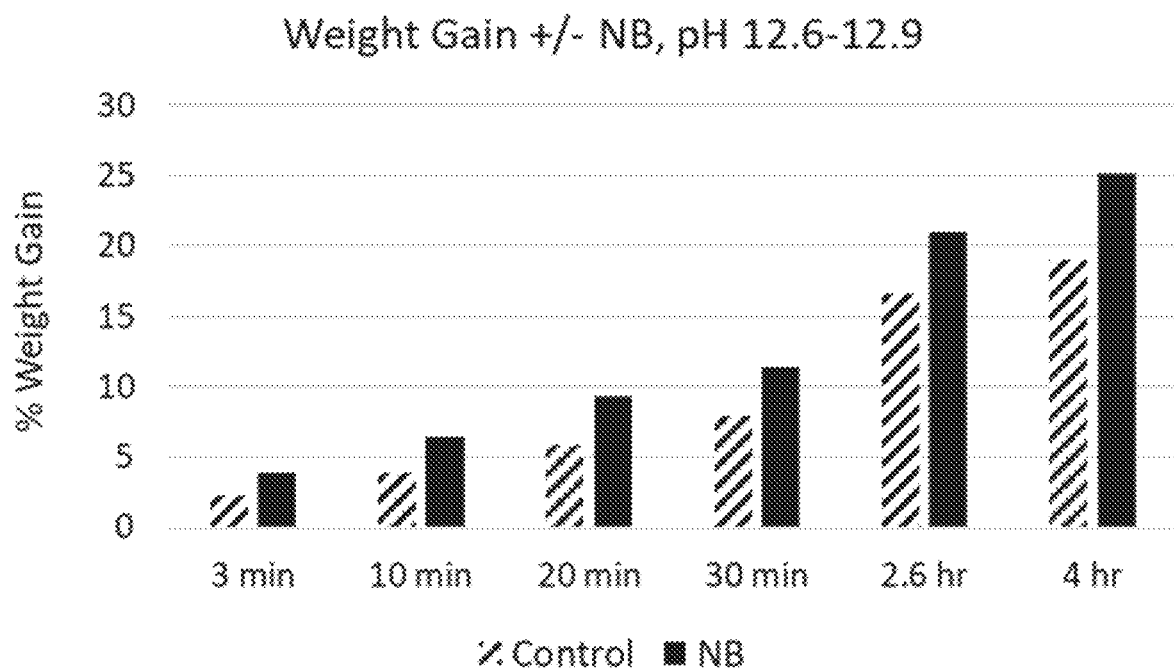
FIG. 17—Effect of NB on weight increase.

FIG. 17 depicts the data of Example 12 relating to the effect of NB on weight increase, as provided in Table 12. The average % weight increase for cut poultry breast meat is shown as a function of time in the absence (Control) or presence (NB) of NB at a pH of 12.6 to 12.9. The data are expressed as an average of two to four separate trials for each of the Control or NB sets of results. The % weight increase is expressed as the ((weight of the poultry at the indicated times divided by the weight of the poultry at time 0)−1)*100.

Figure 18:
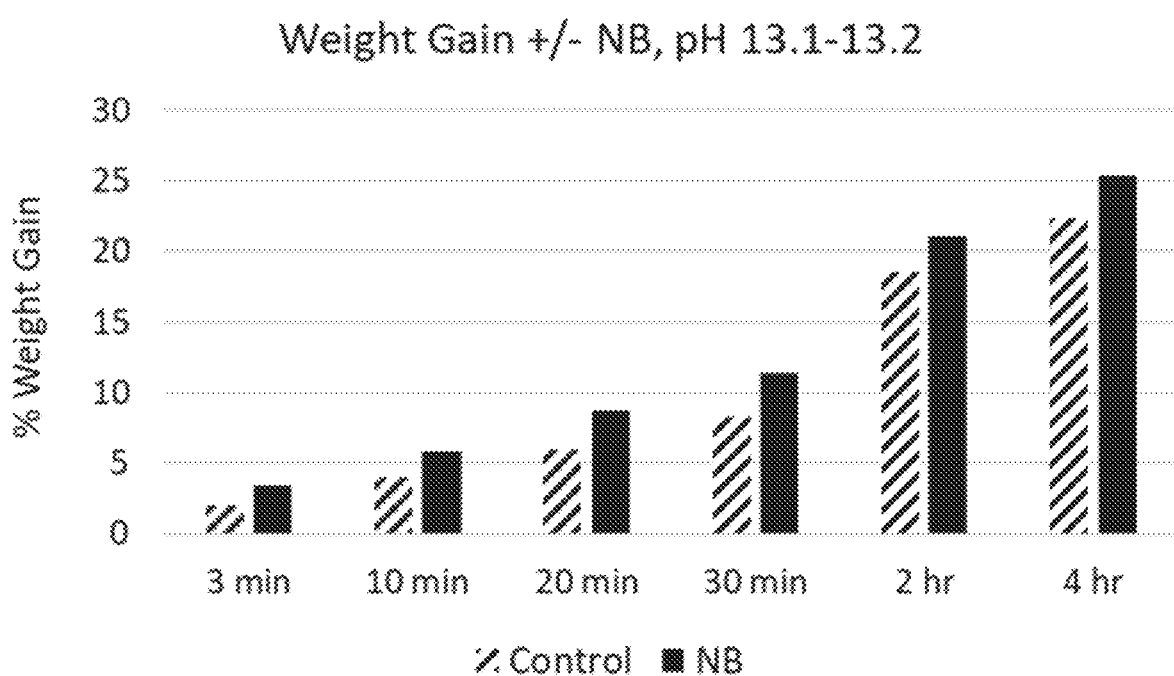
FIG. 18—Effect of NB on weight increase.

FIG. 18 depicts the data of Example 13 relating to the effect of NB on weight increase, as provided in Table 13. The average % weight increase for cut poultry breast meat is shown as a function of time in the absence (Control) or presence (NB) of NB at a pH of 12.6 to 12.9. The data are expressed as an average of two to four separate trials for each of the Control or NB sets of results. The % weight increase is expressed as the ((weight of the poultry at the indicated times divided by the weight of the poultry at time 0)−1)*100.

Figure 19:
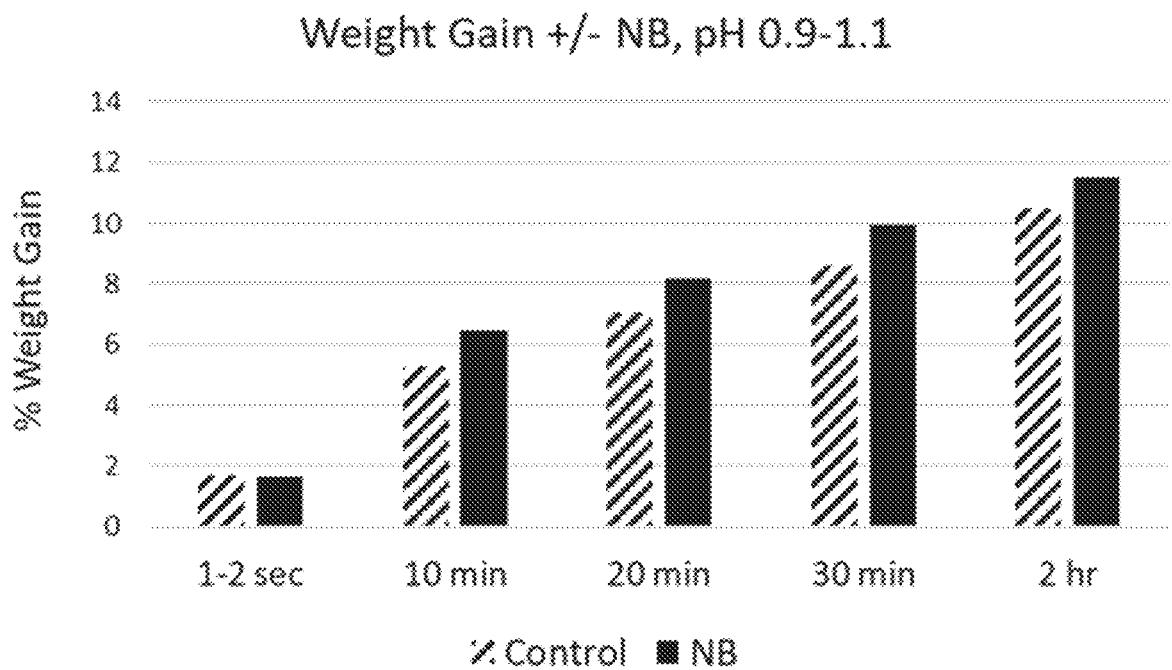
FIG. 19—Effect of NB on weight increase.

FIG. 19 depicts the data of Example 14 relating to the effect of NB on weight increase, as provided in Table 14. The average % weight increase for cut poultry breast meat is shown as a function of time in the absence (Control) or presence (NB) of NB at a pH of 0.9 to 1.1. The data are expressed as an average of two separate trials for each of the Control or NB sets of results. The % weight increase is expressed as the ((weight of the poultry at the indicated times divided by the weight of the poultry at time 0)−1)*100.

Figure 20:
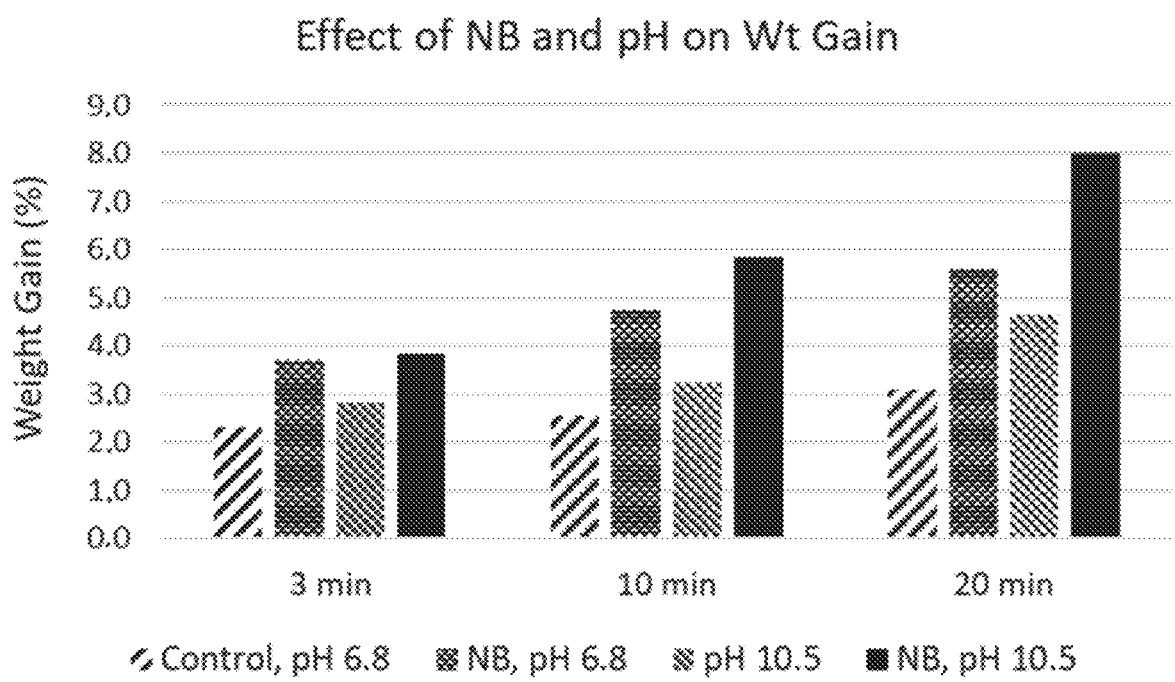
FIG. 20—Effect of NB and pH on weight increase.

FIG. 20 depicts the data of Example 15 relating to the effect of NB and pH on weight increase, as provided in Table 15. The average % weight increase for cut poultry breast meat is shown as a function of time. Control, pH 6.8 is water alone at pH 6.8; NB, pH 6.8 is NB-comprising water at pH 6.8; pH 10.5 is water at pH 10.5; NB, pH 10.5 is NB-comprising water at pH 10.5. The pH of 10.5 was achieved by the addition of NaOH. A pH of 6.8 was the natural pH of the water used. The data are expressed as an average of three separate trials for each set of results. The % weight increase is expressed as the ((weight of the poultry at the indicated times divided by the weight of the poultry at time 0)−1) *100.

Figure 21:
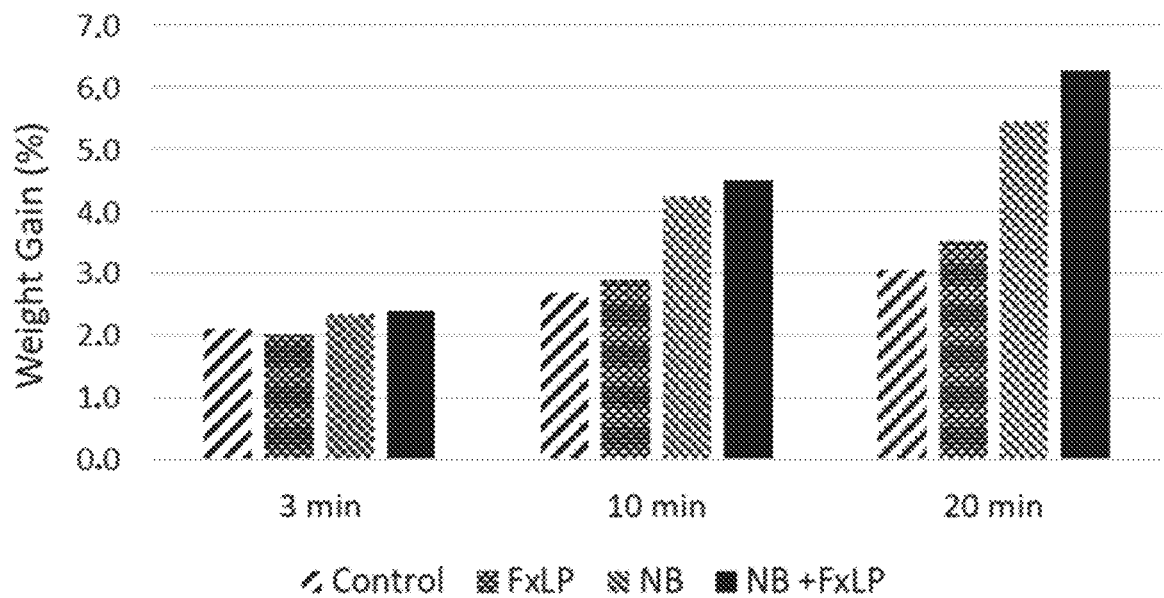
FIG. 21—Effect of NB and FxLP (pH 2.4) on weight increase.

FIG. 21 depicts the data of Example 16 relating to the effect of NB and FxLP at pH 2.4 on weight increase, as provided in Table 16. The average % weight increase for cut poultry breast meat is shown as a function of time. Control is neutral water alone at pH 6.8; FxLP is water with Fresh FxLP added to a pH of 2.4; NB is neutral NB-comprising water; NB+FxLP is NB-comprising water with Fresh FxLP added to a pH of 2.4. The data are expressed as an average of three separate trials for each set of results. The % weight increase is expressed as the ((weight of the poultry at the indicated times divided by the weight of the poultry at time 0)−1)*100.

Figure 22:
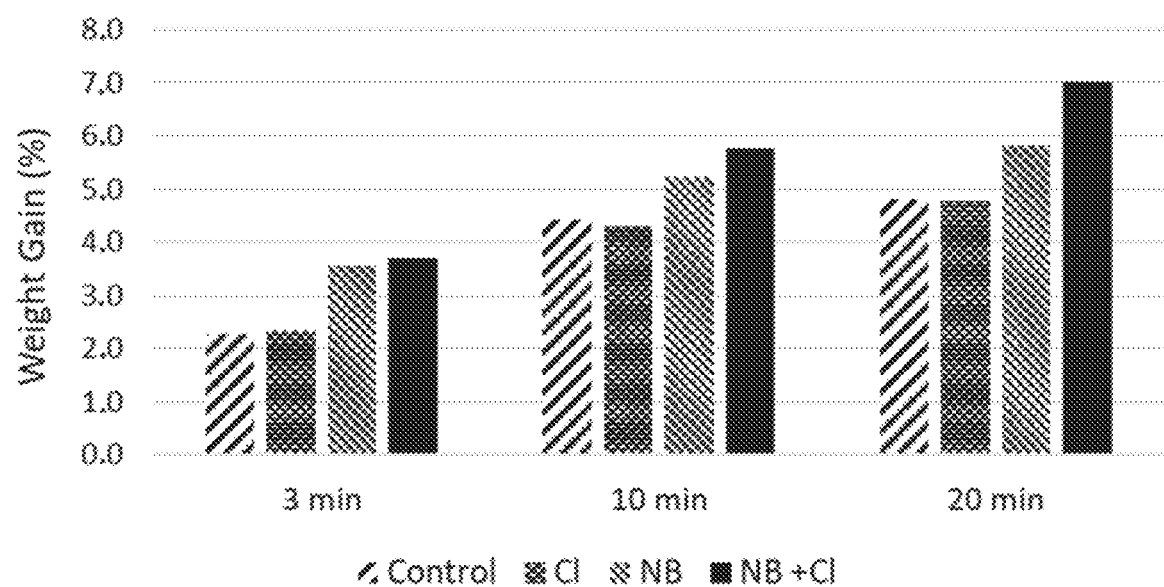
FIG. 22—Effect of NB and hypochlorite on weight increase.

FIG. 22 depicts the data of Example 17 relating to the effect of NB and hypochlorite on weight increase, as provided in Table 17. The average % weight increase for cut poultry breast meat is shown as a function of time. Control is water alone; Cl is water with hypochlorite added to 40-50 PPM; NB is NB-comprising water; NB+Cl is NB-comprising water with hypochlorite added to 40-50 PPM. The data are expressed as an average of three separate trials for each set of results. The % weight increase is expressed as the ((weight of the poultry at the indicated times divided by the weight of the poultry at time 0)−1)*100.

Figure 23:
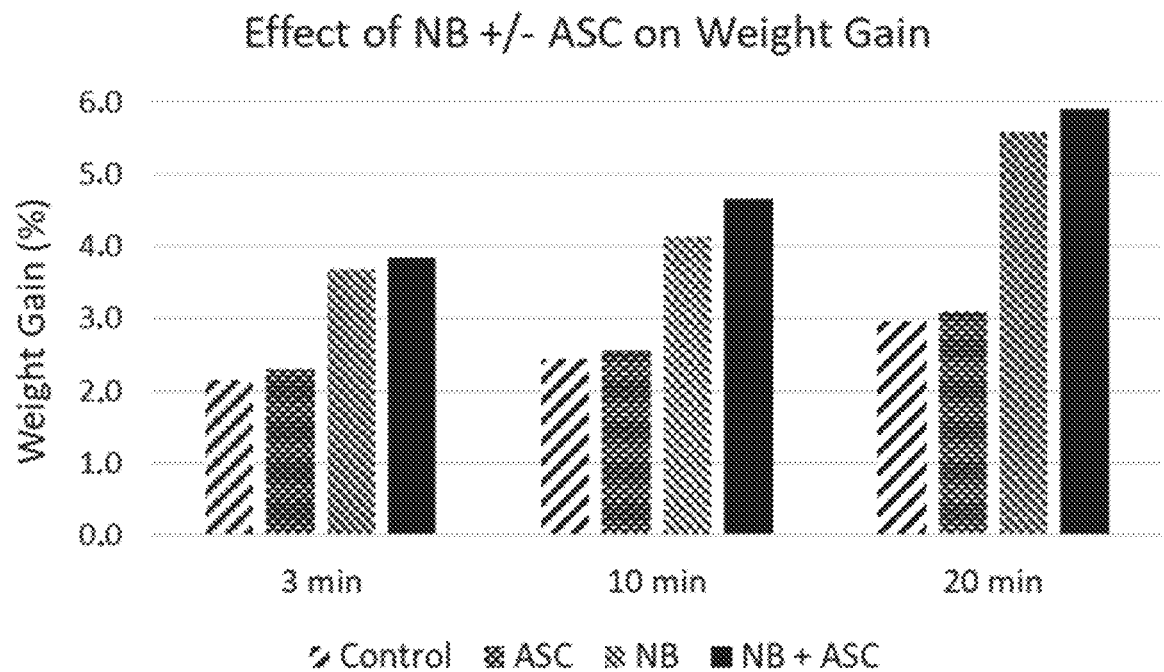
FIG. 23—Effect of NB and acidified sodium chlorite on weight increase.

FIG. 23 depicts the data of Example 18 relating to the effect of NB and acidified sodium chlorite on weight increase, as provided in Table 18. The average % weight increase for cut poultry breast meat is shown as a function of time. Control is water alone; ASC is water with acidified sodium chlorite added to 400-500 PPM; NB is NB-comprising water; NB+ACS is NB-comprising water with acidified sodium chlorite added to 400-500 PPM. The data are expressed as an average of three separate trials for each set of results. The % weight increase is expressed as the ((weight of the poultry at the indicated times divided by the weight of the poultry at time 0)−1)*100. These results are also shown in FIG. 9.

Figure 24:
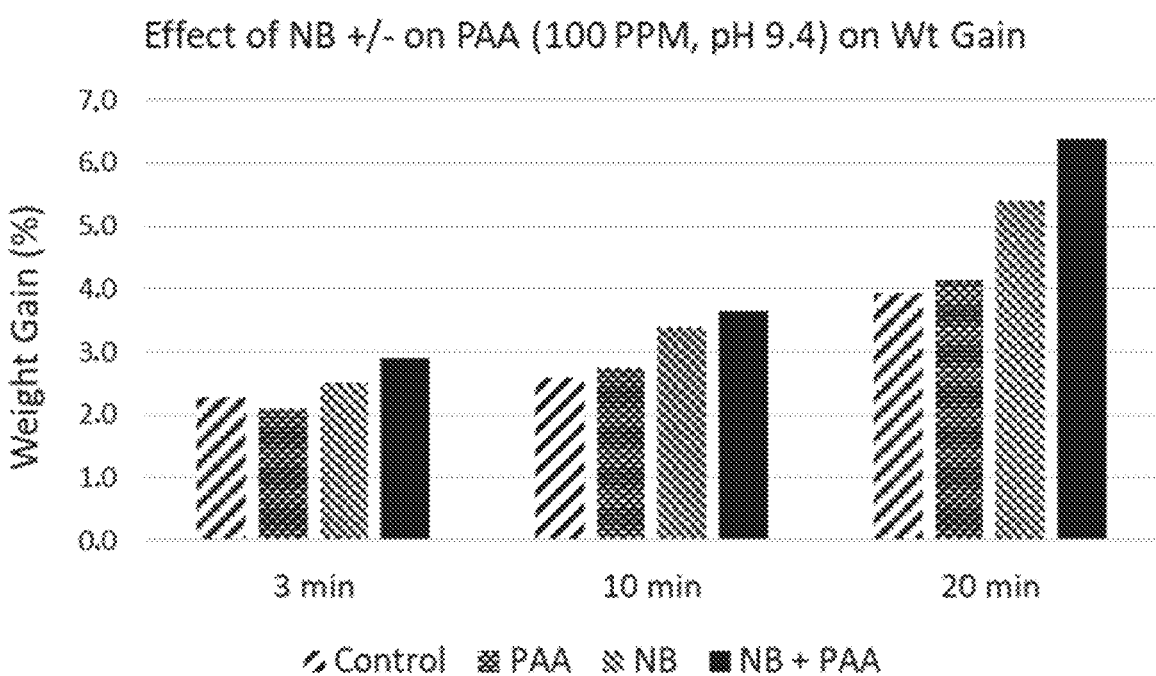
FIG. 24—Effect of NB and peracetic acid at pH 9.4 on weight increase.

FIG. 24 depicts the data of Example 19 relating to the effect of NB and peracetic acid at pH 9.4 on weight increase, as provided in Table 19. The average % weight increase for cut poultry breast meat is shown as a function of time. Control is water alone; PAA is water with peracetic acid (PAA, 100 PPM, pH 9.4); NB is NB-comprising water; NB+PAA is NB-comprising water with peracetic acid (PAA, 100 PPM, pH 9.4). The pH was adjusted to pH 9.4 using NaOH. The data are expressed as an average of three separate trials for each set of results. The % weight increase is expressed as the ((weight of the poultry at the indicated times divided by the weight of the poultry at time 0)−1)*100.

Figure 25:
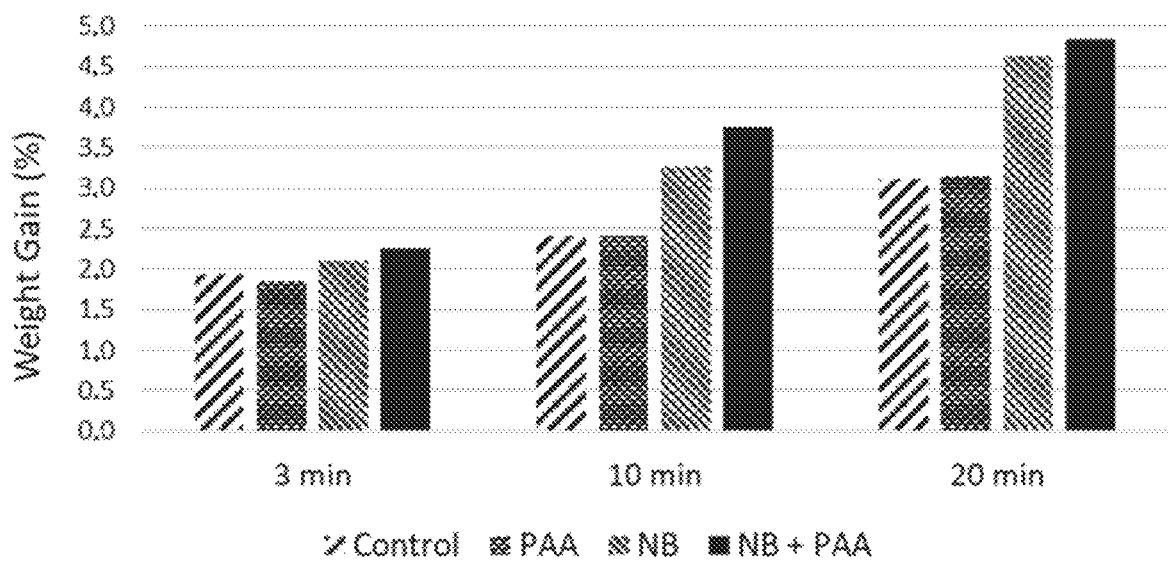
FIG. 25—Effect of NB and peracetic acid at pH 3.5 on weight increase.

FIG. 25 depicts the data of Example 20 relating to the effect of NB and peracetic acid at pH 3.5 on weight increase, as provided in Table 20. The average % weight increase for cut poultry breast meat is shown as a function of time. Control is water alone; PAA is water with peracetic acid (PAA, 450 PPM, pH 3.5); NB is NB-comprising water; NB+PAA is NB-comprising water with peracetic acid (PAA, 450 PPM, pH 3.5). The pH of 3.5 was a result of the acidity of PAA at 450 ppm. The data are expressed as an average of three separate trials for each set of results. The % weight increase is expressed as the ((weight of the poultry at the indicated times divided by the weight of the poultry at time 0)−1)*100.

Figure 26:
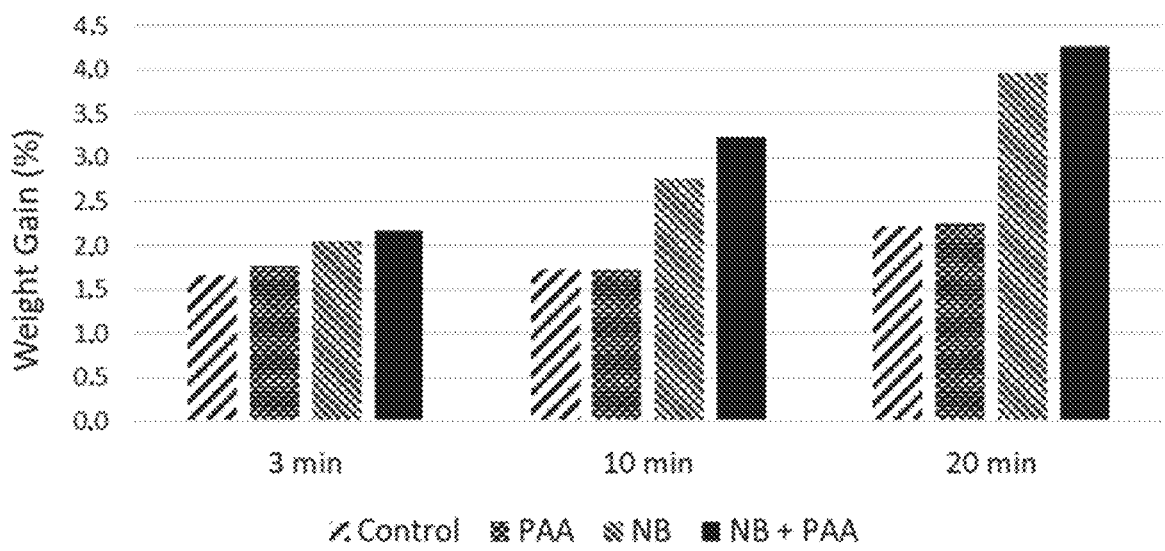
FIG. 26—Effect of NB and peracetic acid at pH 10.5 on weight increase.

FIG. 26 depicts the data of Example 21 relating to the effect of NB and peracetic acid at pH 10.5 on weight increase, as provided in Table 21. The average % weight increase for cut poultry breast meat is shown as a function of time. Control is water alone; PAA is water with peracetic acid (PAA, 450 PPM, pH 10.5); NB is NB-comprising water; NB+PAA is NB-comprising water with peracetic acid (PAA, 450 PPM, pH 10.5). The pH was adjusted to pH 10.5 using NaOH. The data are expressed as an average of three separate trials for each set of results. The % weight increase is expressed as the ((weight of the poultry at the indicated times divided by the weight of the poultry at time 0)−1)*100.

ITEMS OF THE INVENTION

The present invention is also characterized by the following items:

1. A method of treating a food product for increasing the weight of the food product, wherein the food product is selected from a group consisting of: an animal carcass, poultry, meat, seafood and parts thereof, said method comprising:
   introducing Nano Bubbles (NB) into water or an aqueous solution to provide NB-comprising water and
   contacting the food product with NB-comprising water for a time sufficient to increase the weight of the food product.

2. The method of item 1, wherein the nano-bubbles are introduced into water or an aqueous solution by treatment of the water or aqueous solution with a nano-bubbles generator.

3. The method of item 1 or 2, wherein the food product is selected from the group consisting of carcasses, parts or cut products of poultry.

4. The method of one of the items 1 to 3, wherein contacting the food product with NB-comprising water is performed by addition of the food product into a tank or reservoir filled with NB-comprising water, dipping the food product into NB-comprising water, deluge the food product with NB-comprising water, rinse the food product with NB-comprising water or spray the food product with NB-comprising water.

5. The method of one of the items 1 to 4, wherein the NB-comprising water is provided into a tank or reservoir, wherein the food product is contacted with the NB-comprising water, and the NB-comprising water is recirculated by a loop, which leads the NB-comprising water out of the tank or reservoir and provides NB-comprising water into the tank or reservoir.

6. The method of one of the items 1 to 5, wherein the NB-comprising water is provided by melting NB-comprising ice or by supplying NB-comprising ice in a water supply.

7. The method of one of the items 1 to 6, wherein the NB-comprising water has a pH from 1 to 13 while contacting with the food product, preferably 3 to 12.

8. The method of one of the items 1 to 7, wherein the NB-comprising water has a pH from about 1 to about 4, preferably from about 2 to about 3.

9. The method of one of the items 1 to 7, wherein the NB-comprising water has a pH from 9 to 12, preferably from 10 to 11.

10. The method of item 9, wherein the pH is adjusted by using a hydroxide, preferably sodium hydroxide.

11. The method of one of the items 1 to 10, wherein the NB-comprising water comprises an antimicrobial agent, preferably in an amount of from about 1 ppm to about 2000 ppm.

12. The method of item 11, wherein the NB-comprising water comprises the antimicrobial agent in an amount of from about 1 ppm to about 20 ppm.

13. The method of one of the items 1 to 12, wherein the NB-comprising water comprises peracetic acid, preferably from about 1 ppm to 2000 ppm.

14. The method of item 13, wherein the NB-comprising water comprises peracetic acid in an amount of from about 1 ppm to about 20 ppm.

15. The method of one of the items 1 to 14, wherein the NB-comprising water comprises hypochlorite, preferably in an amount of up to 50 ppm.

16. The method of item 15, wherein the NB-comprising water comprises hypochlorite in an amount of from about 1 to about 20 ppm.

17. The method of one of the items 1 to 16, wherein the NB-comprising water comprises acidified sodium chlorite, preferably in an amount of up to 500 ppm.

18. The method of item 17, wherein the NB-comprising water comprises acidified sodium chlorite in an amount of from about 1 to about 20 ppm.

19. The method of one of the items 1 to 18, wherein the temperature of the NB-comprising water while contacting the food product is from −28° C. to 60° C.

20. The method according one of the items 1 to 19, wherein the increase of weight is at least 0.01 wt-% preferably at least 1 wt.-%.

21. The method of one of the items 1 to 20, wherein the NB-comprising water comprises nano bubbles having an average diameter of less than 1,000 nm.

22. The method of one of the items 1 to 21, wherein the contacting occurs at least for 1 minute.

23. The method of one of the items 1 to 22, wherein the nano-bubbles comprises a gas selected from the group consisting of: air, carbon dioxide, oxygen, nitrogen, ozone, hydrogen, and combinations thereof.

24. A method of treating a food product for increasing the weight of the food product, wherein the food product is selected from a group consisting of: an animal carcass, poultry, meat, seafood and parts thereof, said method comprising:
introducing Nano Bubbles (NB) into water or an aqueous solution to provide NB-comprising water and
contacting the food product with NB-comprising water for a time sufficient to increase the weight of the food product,
wherein the NB-comprising water comprises peracetic acid, hypochlorite and/or acidified sodium chlorite.

25. The method of item 24, wherein the method is as further defined in any one of items 1 to 23.

26. A method of treating a food product for increasing the weight of the food product, wherein the food product is selected from a group consisting of: an animal carcass, poultry, meat, seafood and parts thereof, said method comprising:
introducing Nano Bubbles (NB) into water or an aqueous solution to provide NB-comprising water and
contacting the food product with NB-comprising water for a time sufficient to increase the weight of the food product, wherein the NB-comprising water has a pH from about 1 to about 4 or from about 9 to about 12.

27. The method of item 25, wherein the NB-comprising water has a pH from about 1 to about 4, preferably from about 2 to about 3.

28. The method of item 25, wherein the NB-comprising water has a pH from about 9 to about 12, preferably from about 10 to about 11.

29. The method of item 28, wherein the pH is adjusted by using a hydroxide, preferably sodium hydroxide.

30. The method of one of the items 26 to 29, wherein the method is as further defined in any one of items 1 to 25.

31. Use of NB-comprising water for treating a food product for increasing the weight of the food product, wherein the food product is selected from a group consisting of: an animal carcass, poultry, meat, seafood and parts thereof, said use comprising:
introducing Nano Bubbles (NB) into water or an aqueous solution to provide NB-comprising water and
contacting the food product with NB-comprising water for a time sufficient to increase the weight of the food product.

32. The use of item 31, wherein the use is as further defined in any one of items 1 to 30.

EXPERIMENTAL PART

The invention is further illustrated in detail hereinafter with reference to examples and comparative examples, without any intention to limit the scope of the present invention.

ABBREVIATIONS/DEFINITIONS

NB nano-bubbles
% Weight percent
Processing water water that comes in contact with the food product. This could include any water treatments included, but not limited to immersion tank such as a chill tank, other aqueous immersion dips, deluges, rinses, sprays or ice containing NB, and one or more of these come in contact with the poultry carcasses, parts, or cuts.
Poultry any bird, including chicken, turkey, duck, goose, pheasant.
Carcass body of a bird, after exsanguination and after removal of the feathers, viscera, head, and feet. For broiler chickens this is often referred to as a "WOG", meaning "without giblets".
Parts processed poultry resulting from portioning of the carcass.

Preparation of NB-Comprising Water

NB-comprising water was generated using the Moleaer models Neo 250 and Neo 500, which creates nano bubbles as described in US20210299617A1. The resulting NB-comprising water was transferred to various applications in a poultry processing facility and used in laboratory experiments.

Processing water may be treated with NB in a variety of ways. Preferred embodiments include a) treating water with NB to provide NB-comprising water and adding NB-comprising water directly to poultry processing application waters (FIGS. 1 & 2), b) adding NB-comprising water to recirculation loop within application (FIG. 3), c) generating NB in holding tank or dedicated reservoir to provide NB-comprising water then feeding poultry processing applications with NB-comprising water from the reservoir comprising NB-comprising water (FIG. 4), d) transferring NB-comprising water from one treated reservoir to a different application within processing (FIG. 5), e) providing NB-comprising water using NB generator submerged within the application itself.

Measuring Weight Change of Poultry-Parts and Cuts

Chicken was collected from a commercial plant after evisceration and prior to water chilling to mimic the typical process of poultry slaughter facility and the carcass in its most unprocessed form. Chicken was also collected from a processing plant using air-chilling as this poultry was never subjected to a water chilling process that can promote water uptake into the tissues. Alternatively, chicken was purchased from retail establishing selecting product that had also been air-chilled and not exposed to immersion chilling systems.

For the parts trials comparing % weight gain using various treatments, a selected number of the collected poultry parts (such as wing segments, tenders, thighs or breasts) were weighed, and two batches of these were collected with one collection to be used as a Control, the second collection as the experimental. For poultry cuts, whole pieces were first collected and then cut into similar size pieces (for example 4-5 cm cubes of breast meat 0.6-0.7 cm thick slices of breast meat, 2.5 cm slices of tenders or thigh meat).

For any pair of Control and Experimental Collections, each was weighed separately (Denver Instruments APX-2001) and the weight of each recorded. All samples were maintained on ice.

For a single trial, the parts or cuts that had been weighed were placed into a water bath on ice with water alone, where the Control portion of a Control and Experimental pair was placed into one bath, and the Experimental portion into a second bath. Each bath (with shaking) contained the same composition of water in terms of added antimicrobial, adjustment of pH level using NaOH, or other chemical except that the Experimental used NB-comprising water prior to any addition of antimicrobials, chemicals, or adjustment of pH.

Once poultry samples were in their respective shaking water baths a stopwatch was used to measure the dwell time of the poultry in the water (Control) or in the NB-comprising water (Experimental). At selected times after the start of the trial, the poultry parts in their respective baths were strained through a sieve and allowed to drip with occasional shaking for 3 min. The sieve was placed such that the bathing water of the Control or Experimental could be collected for further incubation with the respective poultry. After drip, the poultry was placed on a pre-zeroed weigh boat on a scale, and the weight of the poultry recorded.

In some cases, the poultry on the weigh boat was returned to their respective water baths and the dwell time in the bath obtained until the next sieving, drip, and weigh cycle. This was performed an additional 2 to 3 times for longer dwell times in the water baths. The three minutes for drip, and the time to weigh the poultry, was not counted as dwell time. The dwell times were only measured when the poultry was in contact with the control water or the experimental (NB) water in their respective baths.

All the weights recorded as a function of time were then compared to the original weight of the poultry before entering the bath at Time=0. The ratios of the weight obtained at any time after 0 was divided by the original weight at time 0 to calculate the percent of weight change.

The recorded weights obtained were used as the data for the Tables, using three trials (three control runs and three experimental runs) and averaging the results for each group for each separate time point.

EXAMPLES

All examples were performed using an air/oxygen mixture for generation of nano-bubbles for provision of the NB-comprising water. Experiments were performed at 0-4° C.

Example 1

Comparison of the % weight change of poultry cuts in the presence or absence of NB at a pH of 6.7 to 6.9. For these trials, water from a poultry plant was used as the Control Water, and the same water that was fed through a NB-generator was used as the Experimental, NB-comprising water. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 1

Average % weight increase for cut poultry breast meat as a function of time in the absence (Control) or presence (NB) of NB. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 6.

| | Time | | |
|---|---|---|---|
| | 3 min | 10 min | 20 min |
| Control | 2.30 | 2.55 | 3.09 |
| NB | 3.69 | 4.74 | 5.58 |

Example 2

Comparison of the % weight change of poultry cuts in the presence or absence of NB at a pH of 10.5. For these trials, water from a poultry plant was used as the Control Water, and the same water that was fed through a NB-Generating apparatus was used as the Experimental, NB-comprising water. The pH of both the control water and the NB-comprising water was adjusted to a pH of 10.5 using a solution of 50% sodium hydroxide (NaOH). The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 2

Average % weight increase for cut poultry breast meat as a function of time in the absence (Control) or presence (NB) of NB at a pH of 10.5. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 7.

|  | Time | | |
| --- | --- | --- | --- |
|  | 3 min | 10 min | 20 min |
| Control | 2.03 | 2.93 | 4.85 |
| NB | 3.17 | 5.84 | 7.00 |

Example 3

Comparison of the % weight change of poultry cuts in the presence or absence of NB at a pH of 8.5 to 9.2. For these trials, water from a poultry plant was used as the Control Water, and the same water that was fed through a NB-generator was used as the Experimental, NB-comprising water. The pH of both the control water and the NB-comprising water was adjusted to a pH of 8.5 to 9.2 using a solution of 50% sodium hydroxide (NaOH). The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 3

Average % weight increase for cut poultry breast meat as a function of time in the absence (Control) or presence (NB) of NB at a pH of 8.5 to 9.2. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 8.

|  | Time | | | |
| --- | --- | --- | --- | --- |
|  | 3 min | 10 min | 20 min | 30 min |
| Control | 2.80 | 3.77 | 5.15 | 5.71 |
| NB | 3.22 | 4.30 | 5.95 | 7.61 |

Example 4

Comparison of the % weight change of poultry cuts in the presence or absence of NB at a pH of 1.4 to 1.6. For these trials, water from a poultry plant was used as the Control Water, and the same water that was fed through a NB-generator was used as the Experimental, NB-comprising water. The pH of both the control water and the NB-comprising water was adjusted to a pH of 1.4 to 1.6 using FreshFx LP, a mixed acid blend consisting of a blend of sulfuric, phosphoric, and citric acids, a processing aid on the USDA FSIS 7120.1 Safe & Suitable List as an antimicrobial processing aid and pH control agent. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 4

Average % weight increase for cut poultry breast meat as a function of time in the absence (Control) or presence (NB) of NB at a pH of 1.4 to 1.6 in the presence of a mixed acid blend of sulfuric, phosphoric, and citric acids (FreshFx LP). The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 9.

|  | Time | | |
| --- | --- | --- | --- |
|  | 3 min | 10 min | 20 min |
| Control | 1.63 | 2.68 | 3.44 |
| NB | 2.21 | 3.93 | 6.02 |

Example 5

Comparison of the % weight change of poultry cuts in the presence or absence of NB at a pH of 2.4 to 2.5. For these trials, water from a poultry plant was used as the Control Water, and the same water that was fed through a NB-generator was used as the Experimental, NB-comprising water. The pH of both the control water and the NB-comprising water was adjusted to a pH of 2.4 to 2.5 using FreshFx LP, a mixed acid blend consisting of a blend of sulfuric, phosphoric, and citric acids, a processing aid on the USDA FSIS 7120.1 Safe & Suitable List as an antimicrobial processing aid and pH control agent. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 5

Average % weight increase for cut poultry breast meat as a function of time in the absence (Control) or presense (NB) of NB at a pH of 2.4 to 2.5 in the presence of a mixed acid blend of sulfuric, phosphoric, and citric acids (FreshFx LP). The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 10.

|  | Time | | |
| --- | --- | --- | --- |
|  | 3 min | 10 min | 20 min |
| Control | 2.03 | 2.90 | 3.52 |
| NB | 2.40 | 4.52 | 6.27 |

Example 6

Comparison of the % weight change of poultry cuts in the presence or absence of NB in the presence of 45-50 PPM of hypochlorite, pH 7.5 to 8. For these trials, water from a poultry plant was used as the Control Water, and the same water that was fed through a NB-Generating apparatus was used as the Experimental, NB-comprising water. The hypochlorite was added using a 6% concentrate of hypochlorite to 45-50 PPM, and the resultant pH was measured to be 7.5 to 8. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 6

Average % weight increase for cut poultry breast meat as a function of time in the absence (Control) or presence (NB) of NB in the presence of 45-50 PPM hypochlorite at a pH of 7.5 to 8. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 11.

|  | Time | | |
| --- | --- | --- | --- |
|  | 3 min | 10 min | 20 min |
| Control | 2.32 | 4.30 | 4.79 |
| NB | 3.69 | 5.76 | 7.00 |

Example 7

Comparison of the % weight change of poultry cuts in the presence or absence of NB in the presence of 400-500 PPM acidified sodium chlorite (ASC) at a pH of 6.8 to 7.2. For these trials, water from a poultry plant was used as the Control Water, and the same water that was fed through a NB-generator was used as the Experimental, NB-comprising water. The ASC was produced by mixing a solution of sodium chlorite with an acid blend, FreshFx LP to lower the pH. The mixture was allowed to incubate for 1 hour and then used as an acidified sodium chlorite concentrate based on the PPM of the original sodium chlorite concentration and diluted to 400-500 PPM acidified sodium chlorite (ASC). The pH was measured to be Example 7

6.8 to 7.2. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 7

Average % weight increase for cut poultry breast meat as a function of time in the absence (Control) or presence (NB) of NB in the presence of 400-500 PPM of acidified sodium chlorite (ASC) at a pH of 6.8 to 7.2. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 12.

|  | Time | | |
| --- | --- | --- | --- |
|  | 3 min | 10 min | 20 min |
| Control | 2.66 | 3.58 | 4.32 |
| NB | 3.83 | 4.66 | 5.91 |

Comparison of the % weight change of poultry cuts in the presence or absence of NB in the presence of 400-500 PPM acidified sodium chlorite (ASC) at a pH of 9.1. For these trials, water from a poultry plant was used as the Control Water, and the same water that was fed through a NB-generator was used as the Experimental, NB-comprising water. The ASC was produced by mixing a solution of sodium chlorite with an acid blend, FreshFx LP to lower the pH. The mixture was allowed to incubate for 1 hour and then used as an acidified sodium chlorite concentrate based on the PPM of the original sodium chlorite concentration and diluted to 400-500 PPM ASC. The pH was adjusted to pH 9.1 using NaOH. The poultry used was air-chilled breast meat, 4-5 cm cubes. A similar amount of pieces were weighed out to serve as a sample for each the control sample and the experimental sample to be used as the Time=0 weights. The poultry was Example 8 placed into their respective waters in the baths for the described time points, re-weighed and the % increase in weight was calculated.

TABLE 8

Average % weight increase for cut poultry breast meast as a function of time in the absence (Control) or presence (NB) of NB in the presence of 400-500 PPM of acidified sodium chlorite (ASC) at a pH of 9.1. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 13.

|  | Time | | |
| --- | --- | --- | --- |
|  | 3 min | 10 min | 20 min |
| Control | 1.86 | 2.63 | 4.49 |
| NB | 2.45 | 3.68 | 6.97 |

Example 9

Comparison of the % weight change of poultry cuts in the presence or absence of NB in the presence of 100-130 PPM peracetic acid (PAA) at a pH of 9 to 9.4, with the pH of the solutions adjusted with NaOH. For these trials, water from a poultry plant was used as the Control Water, and the same water that was fed through a NB-generator was used as the Experimental, NB-comprising water. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 9

Average % weight increase for cut poultry breast meat as a function of time in the absence (Control) or presence (NB) of NB in the presence of 100-130 PPM of peracetic acid (PPA) at a pH of 9 to 9.4. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 14.

|  | Time | | |
| --- | --- | --- | --- |
|  | 3 min | 10 min | 20 min |
| Control | 2.27 | 2.60 | 4.93 |
| NB | 2.91 | 3.65 | 6.38 |

Example 10

Comparison of the % weight change of poultry cuts in the presence or absence of NB in the presence of 450-480 PPM peracetic acid (PAA) at a pH of 8.8 to 9.6, with the pH of the solutions adjusted with NaOH. For these trials, water from a poultry plant was used as the Control Water, and the same water that was fed through a NB-generator was used as the Experimental, NB-comprising water. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 10

Average % weight increase for cut poultry breast meat as a function of time in the absence (Control) or presence (NB) of NB in the presence of 450-480 PPM of peracetic acid (PPA) at a pH of 8.8 to 9.6. The data are expressed as average of three separate trials for each of the Control or NB sets of results. The % weight increase is expressed as the ((weight of the poultry at the indicated times divided by the weight of the poultry at time 0) − 1) * 100. These data are also shown in FIG. 15.

|  | Time | | |
| --- | --- | --- | --- |
|  | 3 min | 10 min | 20 min |
| Control | 2.12 | 3.47 | 4.21 |
| NB | 3.44 | 4.68 | 6.11 |

Example 11

Comparison of the % weight change of poultry cuts in the presence or absence of NB in the presence of 450-480 PPM peracetic acid (PAA) at a pH of 3.5 to 3.6. For these trials, water from a poultry plant was used as the Control Water, and the same water that was fed through a NB-generator was used as the Experimental, NB-comprising water. The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 11

Average % weight increase for cut poultry breast meat as a function of time in the absence (Control) or presence (NB) of NB in the presence of 450-480 PPM of peracetic acid (PPA) at a pH 3.5 to 3.6. The data are expressed as an average of three separate trials for each of the Control or NB sets of results. The % weight increase is expressed as the ((weight of the poultry at the indicated times divided by the weight of the poultry at time 0) − 1) * 100. These data are also shown in FIG. 16.

|  | Time | | |
| --- | --- | --- | --- |
|  | 3 min | 10 min | 20 min |
| Control | 1.85 | 2.61 | 3.34 |
| NB | 2.26 | 3.76 | 4.84 |

Example 12

Comparison of the % weight change of poultry cuts in the presence or absence of NB at a pH of 12.6 to 12.9. For these trials, water from a poultry plant was used as the Control Water, and the same water that was fed through a NB-generator was used as the Experimental, NB-comprising water. The pH of both the control water and the NB-comprising water was adjusted to a pH of 12.5 to 12.9 (Accumet AR50 PH meter) using a solution of 50% sodium hydroxide (NaOH). The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 12

Average % weight increase for cut poultry breast meat as a function of time in the absence (Control) or presence (NB) of NB at a pH of 12.6 to 12.9. The data are expressed as an average of two to four separate trials for each of the Control or NB sets of results. The % weight increase is expressed as the ((weight of the poultry at the indicated times divided by the weight of the poultry at time 0) − 1) * 100. These data are also shown in FIG. 17.

|  | Time | | | | | |
| --- | --- | --- | --- | --- | --- | --- |
|  | 3 min | 10 min | 20 min | 30 min | 2.6 hr | 4 hr |
| Control | 2.2 | 4.2 | 6.5 | 8.8 | 16.6 | 19.1 |
| NB | 3.9 | 5.5 | 8.5 | 11.2 | 21.0 | 25.1 |

Example 13

Comparison of the % weight change of poultry cuts in the presence or absence of NB at a pH of 13.1 to 13.2. For these trials, water from a poultry plant was used as the Control Water, and the same water that was fed through a NB-generator was used as the Experimental, NB-comprising water. The pH of both the control water and the NB-comprising water was adjusted to a pH of 13.1 to 13.2 (Accumet AR50 PH meter) using a solution of 50% sodium hydroxide (NaOH). The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 13

Average % weight increase for cut poultry breast meat as a function of time in the absence (Control) or presence (NB) of NB at a pH of 12.6 to 12.9. The data are expressed as an average of two to four separate trials for each of the Control or NB sets of results. The % weight increase is expressed as the ((weight of the poultry at the indicated times divided by the weight of the poultry at time 0) − 1) * 100. These data are also shown in FIG. 18.

| | Time | | | | | |
|---|---|---|---|---|---|---|
| | 3 min | 10 min | 20 min | 30 min | 2 hr | 4 hr |
| Control | 2.1 | 4.0 | 6.0 | 8.3 | 18.5 | 22.3 |
| NB | 3.5 | 5.8 | 8.7 | 11.4 | 21.1 | 25.4 |

Example 14

Comparison of the % weight change of poultry cuts in the presence or absence of NB at a pH of 0.99 to 1.1. For these trials, water from a poultry plant was used as the Control Water, and the same water that was fed through a NB-generator was used as the Experimental, NB-comprising water. The pH of both the control water and the NB-comprising water was adjusted to a pH of 0.9 to 1.1 using a solution of FreshFx LP concentrate (blend of sulfuric, phosphoric and citric acids). The poultry used was air-chilled breast meat, cut into 4-5 cm cubes. A similar amount of pieces were weighed out to serve as a sample for each the control sample and the experimental sample to be used as the Time=0 weights. The poultry was placed into their respective waters in the baths for the described time points, re-weighed and the % increase in weight was calculated.

TABLE 14

Average % weight increase for cut poultry breast meat as a function of time in the absence (Control) of presence (NB) of NB at a pH of 0.9 to 1.1. The data are expressed as an average of two separate trials for each of the Control or NB sets of results. The % weight increase is expressed as the ((weight of the poultry at the indicated times divided by the weight of the poultry at time 0) − 1) * 100. These data are also shown in FIG. 19.

| | Time | | | | |
|---|---|---|---|---|---|
| | 1-2 sec | 10 min | 20 min | 30 min | 2 hr |
| Control | 1.7 | 5.3 | 7.0 | 8.6 | 10.5 |
| NB | 1.7 | 6.5 | 8.2 | 9.9 | 11.5 |

Summary: The above examples show that under all these conditions tested that poultry cuts, when incubated in water increase in weight as a function of time. However, in the presence of nano-bubbles (NB) under all the conditions tested, that the weight increase is greater when compared to water without NB.

The inventors conducted further experiments in order to directly compare the weight gain achieved with water, NB-comprising water, water with additional acid or base in order to adjust the pH, and NB-comprising water with additional acid or base. Also, experiments were conducted to directly compare the weight gain achieved with water, water with an antimicrobial substance, NB-comprising water, and NB comprising water with the antimicrobial substance. The general procedures are outlined in the following. Further details and results are given in Examples 15 to 21, and FIGS. 20 to 26.

Preparation of NB-comprising water was carried out as described herein above.

Measuring Weight Change of Poultry-Parts and Cuts.

Chicken was collected from a processing plant using air-chilling as this poultry was never subjected to a water chilling process that can promote water uptake into the tissues. Alternatively, chicken was purchased from retail establishing selecting product that had also been air-chilled and not exposed to immersion chilling systems. Chicken was also taken from plants that perform immersion chilling, but the chicken was collected prior to water chilling (i.e., pre-chill samples). All poultry collected was stored in plastic bags on ice until used for the present application.

For the parts trials comparing % weight gain using various treatments, a selected number of the collected poultry parts (such as wing segments, tenders, thighs or breasts) were weighed, and batches of these were collected. One would be used as a Control, to be exposed to water alone. A second batch was to be used in the presence of any added chemical(s) in the absence of NB. A third was used with NB in water. The fourth batch was used for the case where NB are present along with any added chemical(s). For "chemical(s)" it is meant either such substances as hypochlorite, peracetic acid, etc., or the case where the pH adjusted e.g. with NaOH either in the presence or absence of other chemicals. For poultry cuts, whole pieces were first collected and then cut into similar size pieces (e.g., 4-5 cm cubes of breast meat, 0.6-0.7 cm thick slices of breast meat, 2.5 cm slices of tenders or thigh meat).

For any set of experimental batches as described above, each was weighed separately (Denver Instruments APX-2001) and the weight of each recorded. All samples were maintained on ice.

For a single trail, the parts or cuts that had been weighed were placed into a water bath on ice under the four conditions cited above. Once poultry samples were in their respective shaking water baths a stopwatch was used to measure the dwell time of the poultry in the baths. At select times after the start of the trial, the poultry parts in their respective baths were strained through a sieve and allowed to drip with occasional shaking for 3 min. The sieve was placed such that the bathing water of the poultry could be collected for further incubation with the respective poultry. After drip, the poultry was placed on a pre-zeroed weigh boat on a scale, and the weight of the poultry recorded.

In some cases, the poultry on the weigh boat was returned to their respective water baths and the dwell time in the bath obtained until the next sieving, drip, and weigh step. This was performed an additional 2 to 3 times for longer dwell times in the water baths. The three minutes for drip, and the time to weigh the poultry, was not counted as dwell time. The dwell times were only measured when the poultry was in contact with the water bath in one of the four conditions described.

All the weights recorded as a function of time were then compared to the original weight of the poultry before entering the bath at Time=0. The ratios of the weight obtained at any time after 0 was divided by the original weight at time 0 to calculate the percent of weight change.

The recorded weights obtained were used as the data for the Tables and Figures, using three trials (three control runs and three experimental runs) and averaging the results for each group for each separate time point.

Example 15

Comparison of the % weight change of poultry cuts in water alone in the absence of NB at pH 6.8 (control), water in the presence of NB at pH 6.8, water in the absence of NB at pH 10.5, and water in the presence of NB at pH 10.5. For these trials, water from a poultry plant was used as the Control Water at pH 6.8, and the same water that was fed through a NB-generator was used as the experimental, NB-comprising water at pH 6.8. The same water was also used in the absence of NB at pH 10.5, and in the presence of NB at pH 10.5. The pH was adjusted to a pH of 10.5 using a solution of 50% sodium hydroxide (NaOH). The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 15

Average % weight increase for cut poultry breast meat as a function of time. Control, pH 6.8 is water alone at pH 6.8; NB, pH 6.8 is NB-compromising water at pH 6.8; pH 10.5 is water without NB at pH 10.5; NB, pH 10.5 is NB-comprising water at pH 10.5. The pH of 10.5 was achieved by the addition of NaOH. A pH of 6.8 was the natural pH of the water used. The data are expressed as an average of three separate trials for each set of results. The % weight increase is expressed as the ((weight of the poultry at the indicated times divided by the weight of the poultry at time 0) − 1) * 100. These data are also shown in FIG. 20.

|  | Time | | |
|---|---|---|---|
|  | 3 min | 10 min | 20 min |
| Control, pH 6.8 | 2.30 | 2.55 | 3.09 |
| NB, pH 6.8 | 3.69 | 4.74 | 5.58 |
| pH 10.5 | 2.83 | 3.23 | 4.65 |
| NB, pH 10.5 | 3.82 | 5.84 | 8.00 |

Example 16

Comparison of the % weight change of poultry cuts in water alone in the absence of NB at pH 6.8 (control), water in the absence of NB at pH 2.4, neutral water in the presence of NB, and water in the presence of NB at pH 2.4. For these trials, water from a poultry plant was used as the Control Water, and the same water that was fed through a NB-generator was used as the experimental, NB-comprising water. The same water was also used as the Experimental in the absence of NB at pH 2.4, and in the presence of NB at pH 2.4. The pH was adjusted to a pH of 2.4 using Fresh FxLP, a mixed acid blend consisting of a blend of sulfuric, phosphoric, and citric acids, a processing aid on the USDA FSIS 7120.1 Safe & Suitable List as an antimicrobial processing aid and pH control agent. The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 16

Average % weight increase for cut poultry breast meat as a function of time. Control is water alone at pH 6.8; FxLP is water with Fresh FxLP added to a pH of 2.4; NB is neutral NB-comprising water; NB + FxLP is NB-comprising water with Fresh FxLP added to a pH of 2.4. The data are expressed as an average of three separate trials for each set of results. The % weight increase is expressed as the ((weight of the poultry at the indicated times divided by the weight of the poultry at time 0) − 1) * 100. These data are also shown in FIG. 21.

|  | Time | | |
|---|---|---|---|
|  | 3 min | 10 min | 20 min |
| Control | 2.11 | 2.69 | 3.05 |
| FxLP | 2.03 | 2.90 | 3.52 |
| NB | 2.36 | 4.24 | 5.46 |
| NB + FxLP | 2.40 | 4.52 | 6.27 |

Example 17

Comparison of the % weight change of poultry cuts in water alone in the absence of NB (control), water in the absence of NB and in the presence of hypochlorite, water in the presence of NB, and water in the presence of both NB and hypochlorite. For these trials, water from a poultry plant was used as the Control Water, and the same water that was fed through a NB-generator was used as the experimental, NB-comprising water. The same water was also used in the absence of NB and in the presence of hypochlorite, and in the presence of both NB and hypochlorite. The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 17

Average % weight increase for cut poultry breast meat as a function of time. Control is water alone; Cl is water with hypochlorite added to 40-50 PPM; NB is NB-comprising water; NB + Cl is NB-comprising water with hypochlorite added to 40-50 PPM. The data are expressed as an average of three separate trials for each set of results. The % weight increase is expressed as the ((weight of the poultry at the indicated times divided by the weight of the poultry at time 0) − 1) * 100. These data are also shown in FIG. 22.

|  | Time | | |
|---|---|---|---|
|  | 3 min | 10 min | 20 min |
| Control | 2.26 | 4.41 | 4.81 |
| Cl | 2.32 | 4.30 | 4.79 |
| NB | 3.55 | 5.22 | 5.83 |
| NB + Cl | 3.69 | 5.76 | 7.00 |

Example 18

Comparison of the % weight change of poultry cuts in water alone in the absence of NB (control), water in the absence of NB and in the presence of acidified sodium hypochlorite (ASC), water in the presence of NB, and water in the presence of both NB and acidified sodium hypochlorite (ASC). For these trials, water from a poultry plant was used as the Control Water, and the same water that was fed through a NB-generator was used as the experimental, NB-comprising water. The same water was also used in the absence of NB and in the presence of acidified sodium hypochlorite (ASC), and in the presence of both NB and acidified sodium hypochlorite (ASC). The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 18

Average % weight increase for cut poultry breast meat as a function of time. Control is water alone; ASC is water with acidified sodium chlorite added to 400-500 PPM; NB is NB-comprising water; NB + ACS is NB-comprising water with acidified sodium chlorite added to 400-500 PPM. The data are expressed as an average of three separate trials for each set of results. The % weight increase is expressed as the ((weight of the poultry at the indicated times divided by the weight of the poultry at time 0) − 1) * 100. These data are also shown in FIG. 23.

| | Time | | |
|---|---|---|---|
| | 3 min | 10 min | 20 min |
| Control | 2.15 | 2.43 | 2.95 |
| ASC | 2.30 | 2.55 | 3.09 |
| NB | 3.69 | 4.14 | 5.58 |
| NB + ASC | 3.83 | 4.66 | 5.91 |

Example 19

Comparison of the % weight change of poultry cuts in water alone in the absence of NB (control), water in the absence of NB and in the presence of peracetic acid (PAA) at pH 9.4, water in the presence of NB, and water in the presence of both NB and peracetic acid (PAA) at pH 9.4. For these trials, water from a poultry plant was used as the Control Water, and the same water that was fed through a NB-generator was used as the experimental, NB-comprising water. The same water was also used in the absence of NB and in the presence of peracetic acid (PAA) at pH 9.4, and in the presence of both NB and peracetic acid (ASC) at pH 9.4. The pH was adjusted to a pH of 10.5 using a solution of 50% sodium hydroxide (NaOH). The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 19

Average % weight increase for cut poultry breast meat as a function of time. Control is water alone; PAA is water with peracetic acid (PAA, 100 PPM, pH 9.4); NB is NB-comprising water; NB + PAA is NB-comprising water with peracetic acid (PAA, 100 PPM, pH 9.4). The pH was adjusted to pH 9.4 using NaOH. The data are expressed as an average of three separate trials for each set of results. The % weight increase is expressed as the ((weight of the poultry at the indicated times divided by the weight of the poultry at time 0) − 1) * 100. These data are also shown in FIG. 24.

| | Time | | |
|---|---|---|---|
| | 3 min | 10 min | 20 min |
| Control | 2.27 | 2.60 | 3.93 |
| PAA, pH 9.4 | 2.11 | 2.75 | 4.13 |

TABLE 19-continued

Average % weight increase for cut poultry breast meat as a function of time. Control is water alone; PAA is water with peracetic acid (PAA, 100 PPM, pH 9.4); NB is NB-comprising water; NB + PAA is NB-comprising water with peracetic acid (PAA, 100 PPM, pH 9.4). The pH was adjusted to pH 9.4 using NaOH. The data are expressed as an average of three separate trials for each set of results. The % weight increase is expressed as the ((weight of the poultry at the indicated times divided by the weight of the poultry at time 0) − 1) * 100. These data are also shown in FIG. 24.

| | Time | | |
|---|---|---|---|
| | 3 min | 10 min | 20 min |
| NB | 2.50 | 3.40 | 5.40 |
| NB + PAA, pH 9.4 | 2.91 | 3.65 | 6.38 |

Example 16

Comparison of the % weight change of poultry cuts in water alone in the absence of NB (control), water in the absence of NB and in the presence of peracetic acid (PAA) at pH 3.5, water in the presence of NB, and water in the presence of both NB and peracetic acid (PAA) at pH 3.5. For these trials, water from a poultry plant was used as the Control Water, and the same water that was fed through a NB-generator was used as the experimental, NB-comprising water. The same water was also used in the absence of NB and in the presence of peracetic acid (PAA) at pH 3.5, and in the presence of both NB and peracetic acid (PAA) at pH 3.5. The pH of 3.5 was a result of the acidity of PAA at 450 ppm. The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 20

Average % weight increase for cut poultry breast meat as a function of time. Control is water alone; PAA is water with peracetic acid (PAA, 450 PPM, pH 3.5); NB is NB-comprising water; NB + PAA is NB-comprising water with peracetic acid (PAA, 450 PPM, pH 3.5). The pH of 3.5 was a result of the acidity of PAA at 450 ppm. The data are expressed as an average of three separate trials for each set of results. The % weight increase is expressed as the ((weight of the poultry at the indicated times divided by the weight of the poultry at time 0) − 1) * 100. These data are also shown in FIG. 25.

| | Time | | |
|---|---|---|---|
| | 3 min | 10 min | 20 min |
| Control | 1.94 | 2.41 | 3.11 |
| PAA, pH 3.5 | 1.85 | 2.41 | 3.14 |
| NB | 2.10 | 3.26 | 4.62 |
| NB + ASC, pH 3.5 | 2.26 | 3.76 | 4.84 |

Example 21

Comparison of the % weight change of poultry cuts in water alone in the absence of NB (control), water in the absence of NB and in the presence of peracetic acid (PAA) at pH 10.5, water in the presence of NB, and water in the presence of both NB and peracetic acid (PAA) at pH 10.5. For these trials, water from a poultry plant was used as the Control Water, and the same water that was fed through a NB-generator was used as the experimental, NB-comprising water. The same water was also used in the absence of NB and in the presence of peracetic acid (PAA) at pH 10.5, and in the presence of both NB and peracetic acid (PAA) at pH 10.5. The pH was adjusted to a pH of 10.5 using a solution of 50% sodium hydroxide (NaOH). The poultry used was air-chilled breast meat, cut into 4-5 cm cubes. A similar amount of pieces were weighed out to serve as a sample for each the control sample and the experimental samples to be used as the Time=0 weights. The poultry was placed into their respective baths for the described time points, re-weighed and the % increase in weight was calculated.

TABLE 20

Average % weight increase for cut poultry breast meat as a function of time. Control is water alone; PAA is water with peracetic acid (PAA, 450 PPM, pH 10.5); NB is NB-comprising water; NB + PAA is NB-comprising water with peracetic acid (PAA, 450 PPM, pH 10.5). The pH was adjusted to pH 10.5 using NaOH. The data are expressed as an average of three separate trials for each set of results. The % weight increase is expressed as the ((weight of the poultry at the indicated times divided by the weight of the poultry at time 0) − 1) * 100. These data are also shown in FIG. 26.

|  | Time | | |
| --- | --- | --- | --- |
|  | 3 min | 10 min | 20 min |
| Control | 1.66 | 1.73 | 2.22 |
| PAA, pH 10.5 | 1.77 | 1.73 | 2.25 |
| NB | 2.05 | 2.76 | 3.97 |
| NB + PAA, pH 10.5 | 2.18 | 3.24 | 4.26 |

Summary: The above examples show that, under these conditions tested, poultry cuts, when incubated in neutral water alone, increase the weight as a function of time. However, in the presence of nano-bubbles (NB) under all the conditions tested, the weight increase is greater when compared to water without NB. Further, poultry cuts, when incubated in water at acidic or alkaline pH, which is adjusted by adding acid or base, increase the weight as a function of time. Even more, in the presence of nano-bubbles (NB) at acidic or alkaline pH, the weight increase is greater when compared to water at acidic or alkaline pH without NB. Moreover, poultry cuts, when incubated in water comprising other chemical agent(s), such as e.g. an antimicrobial substance like hypochlorite, acidified sodium chlorite or peracetic acid, increase the weight as a function of time. In the presence of nano-bubbles (NB), the weight increase is each time greater when compared to water comprising the chemical agent without NB. Accordingly, the above examples show that nanobubbles and further chemical agents, such as e.g. acid, base and/or antimicrobial substances, in water provide a synergistic effect to increase the weight of the poultry cuts.

The invention claimed is:

1. A method of treating a food product for increasing a weight of the food product, wherein the food product is selected from the group consisting of an animal carcass, poultry, meat, seafood and parts thereof, said method comprising:
    introducing Nano Bubbles (NB) into water or an aqueous solution to provide NB-comprising water and
    contacting the food product with NB-comprising water for a time sufficient to increase the weight of the food product,
wherein the NB-comprising water comprises at least one compound selected from the group consisting of peracetic acid, hypochlorite and acidified sodium chlorite.

2. A method of treating a food product for increasing a weight of the food product, wherein the food product is selected from the group consisting of an animal carcass, poultry, meat, seafood and parts thereof, said method comprising:
    introducing Nano Bubbles (NB) into water or an aqueous solution to provide NB-comprising water and
    contacting the food product with NB-comprising water for a time sufficient to increase the weight of the food product,
wherein the NB-comprising water has a pH from about 1 to about 4 or from about 9 to about 12.

3. The method of claim 1, wherein the nano-bubbles are introduced into water or an aqueous solution by treatment of the water or aqueous solution with a nano-bubbles generator.

4. The method of claim 1, wherein the food product is selected from the group consisting of carcasses and parts or cut products of poultry.

5. The method of claim 1, wherein contacting the food product with NB-comprising water is performed by addition of the food product into a tank or reservoir filled with NB-comprising water, dipping the food product into NB-comprising water, deluging the food product with NB-comprising water, rinsing the food product with NB-comprising water or spraying the food product with NB-comprising water.

6. The method of claim 1, wherein the NB-comprising water is provided into a tank or reservoir, wherein the food product is contacted with the NB-comprising water, and the NB-comprising water is recirculated by a loop, which leads the NB-comprising water out of the tank or reservoir and provides NB-comprising water into the tank or reservoir.

7. The method of claim 1, wherein the NB-comprising water is provided by melting NB-comprising ice or by supplying NB-comprising ice in a water supply.

8. The method of claim 1, wherein the NB-comprising water has a pH from 1 to 13 while contacting with the food product.

9. The method of claim 2, wherein the NB-comprising water has a pH from about 9 to about 12, and wherein the pH is adjusted by using sodium hydroxide.

10. The method of claim 2, wherein the NB-comprising water comprises an antimicrobial substance.

11. The method of claim 10, wherein the NB-comprising water comprises the antimicrobial substance in an amount of from about 1 ppm to about 20 ppm.

12. The method of claim 10, wherein the antimicrobial substance is selected from the group consisting of peracetic acid, hypochlorite, acidified sodium chlorite and any combination thereof.

13. The method of claim 1, wherein the NB-comprising water comprises peracetic acid.

14. The method of claim 13, wherein the NB-comprising water comprises peracetic acid in an amount of from about 1 to about 20 ppm.

15. The method of claim 1, wherein the NB-comprising water comprises hypochlorite.

16. The method of claim 15, wherein the NB-comprising water comprises hypochlorite in an amount of from about 1 to about 20 ppm.

17. The method of claim 1, wherein the NB-comprising water comprises acidified sodium chlorite.

18. The method of claim 17, wherein the NB-comprising water comprises acidified sodium chlorite in an amount of from about 1 to about 20 ppm.

19. The method of claim 1, wherein a temperature of the NB-comprising water while contacting the food product is from −28° C. to 60° C.

20. The method according to claim 1, wherein an increase of weight is at least 0.01 wt-%.

21. The method of claim 1, wherein the NB-comprising water comprises nano bubbles having an average diameter of less than 1,000 nm.

22. The method of claim 1, wherein the contacting occurs at least for 1 minute.

23. The method of claim 1, wherein the nano-bubbles comprise a gas selected from the group consisting of air, carbon dioxide, oxygen, nitrogen, ozone, hydrogen, and combinations thereof.

* * * * *